(12) United States Patent
Long et al.

(10) Patent No.: US 12,090,547 B1
(45) Date of Patent: Sep. 17, 2024

(54) ONLINE COOPERATIVE CONTROL METHOD FOR SOFT REDUCTION AND HEAVY REDUCTION IN BLOOM CONTINUOUS CASTING

(71) Applicant: Chongqing University, Chongqing (CN)

(72) Inventors: Mujun Long, Chongqing (CN); Songyuan Ai, Chongqing (CN); Dengfu Chen, Chongqing (CN); Yongzhi Zhou, Chongqing (CN); Yanming Zhang, Chongqing (CN); Yizhe Du, Chongqing (CN)

(73) Assignee: Chongqing University, Chongqing (CN)

( * ) Notice: Subject to any disclaimer, the term of this patent is extended or adjusted under 35 U.S.C. 154(b) by 0 days.

(21) Appl. No.: 18/468,065

(22) Filed: Sep. 15, 2023

(30) Foreign Application Priority Data

Apr. 12, 2023 (CN) .......................... 202310386036.7

(51) Int. Cl.
*B22D 11/20* (2006.01)
*B22D 11/00* (2006.01)
*B22D 11/22* (2006.01)

(52) U.S. Cl.
CPC ............ *B22D 11/20* (2013.01); *B22D 11/001* (2013.01); *B22D 11/225* (2013.01)

(58) Field of Classification Search
CPC ....... B22D 11/00; B22D 11/001; B22D 11/20; B22D 11/22; B22D 11/225

USPC ................. 164/452, 454, 455, 476, 417
See application file for complete search history.

(56) References Cited

U.S. PATENT DOCUMENTS

| | | | |
|---|---|---|---|
| 6,470,957 B1 * | 10/2002 | Ashburn ................ | B22D 11/18 164/455 |
| 7,462,250 B2 * | 12/2008 | Yamasaki et al. ....... | C22C 38/04 148/333 |

* cited by examiner

*Primary Examiner* — Kevin P Kerns
(74) *Attorney, Agent, or Firm* — Myers Bigel, P.A.

(57) ABSTRACT

Provided is an online cooperative control method for soft reduction and heavy reduction in bloom continuous casting. A quantitative relationship of a theoretical ultimate reduction amount to a reduction position is accurately determined according to an offline three-dimensional solidification and heat transfer model for a continuous casting bloom and a three-dimensional reduction model for a continuous casting bloom under thermo-mechanical coupling; a thermal state of a continuous casting bloom, soft reduction and heavy reduction zones, and a total reduction amount are calculated in real time with an online three-dimensional solidification and heat transfer calculation model for a continuous casting bloom; actual reduction amounts of the rollers for soft reduction and heavy reduction are calculated and distributed online based on a real-time equivalent central solid fraction and a theoretical ultimate reduction amount of each reduction roller. Online cooperative control of soft reduction and heavy reduction in bloom continuous casting is realized.

6 Claims, 16 Drawing Sheets

Section of continuous casting bloom GCr15 steel

| (a) | Initial calculation results of an online cooperative control method for soft reduction and heavy reduction in bloom continuous casting | | | | | | | | | | | | | | |
|---|---|---|---|---|---|---|---|---|---|---|---|---|---|---|---|
| Related parameters in calculation | Roller No. | $1^\#$ | $2^\#$ | $3^\#$ | $4^\#$ | $5^\#$ | $6^\#$ | $7^\#$ | $8^\#$ | $9^\#$ | $10^\#$ | | | | Alerting level |
| | $T_c$ | 1449 | 1442 | 1435 | 1428 | 1420 | 1410 | 1406 | 1388 | 1353 | 1243 | $Y_{TOT}$ | $Y_S$ | $Y_H$ | $h$ | |
| | $f_s$ | 0.05 | 0.12 | 0.18 | 0.25 | 0.32 | 0.41 | 0.45 | 0.61 | 0.93 | 1.93 | | | | | |
| | $y_s(f_s)$ | - | 0.06 | 0.38 | 0.78 | 1.34 | 2.18 | 2.56 | 4.60 | 10.05 | | | | | | |
| | $y_s'(f_s)$ | 12.91 | 12.34 | 11.76 | 11.19 | 10.53 | 9.71 | 9.38 | 7.91 | 5.04 | | | | | | |
| | $y_h(f_s)$ | 14.76 | 14.56 | 14.35 | 14.15 | 13.91 | 13.62 | 13.50 | 12.97 | 11.95 | 8.72 | | | | | |
| | $y_{max}(f_s)$ | | | 0.38 | 0.78 | 1.34 | 2.18 | 2.56 | 4.60 | 5.04 | 8.72 | | | | | |
| | $y$ | | | | | 0.33 | 2.18 | 2.56 | 4.60 | 5.04 | 8.72 | 35.8 | 14.7 | 21.1 | 65.4 | Red |
| Result output parameter | Performance | Under this production condition, preset reduction amounts are $Y_{TOT}$=35.8 mm, $Y_S$=14.7 mm, and $Y_H$=21.1 mm. $5^\#$-$9^\#$ rollers perform five-roller soft reduction, and $10^\#$ roller performs single-roller heavy reduction. With the alerting coefficient h of 65.4%<95%, the total reduction amount does not reach the predetermined target because the solidification end point of the continuous casting bloom is very near the back and the soft reduction rollers are not used sufficiently. The continuous casting secondary cooling process parameters (such as a secondary cooling water distribution and a casting speed) need to be adjusted, and the thermal state of the continuous casting bloom and the actual reduction amount of each reduction roller are recalculated online. | | | | | | | | | | | | | | |

| (b) | Final calculation results of the online cooperative control method after the adjustment of continuous casting secondary cooling process parameters | | | | | | | | | | | | | | |
|---|---|---|---|---|---|---|---|---|---|---|---|---|---|---|---|
| Related parameters in calculation | Roller No. | $1^\#$ | $2^\#$ | $3^\#$ | $4^\#$ | $5^\#$ | $6^\#$ | $7^\#$ | $8^\#$ | $9^\#$ | $10^\#$ | | | | Alerting level |
| | $T_c$ | 1434 | 1429 | 1421 | 1414 | 1404 | 1386 | 1351 | 1241 | 1185 | 1142 | $Y_{TOT}$ | $Y_S$ | $Y_H$ | $h$ | |
| | $f_s$ | 0.19 | 0.24 | 0.31 | 0.37 | 0.46 | 0.63 | 0.95 | 1.95 | 2.45 | 2.85 | | | | | |
| | $y_s(f_s)$ | 0.43 | 0.72 | 1.26 | 1.82 | 2.76 | 4.86 | 10.42 | | | | | | | | |
| | $y_s'(f_s)$ | 11.68 | 11.27 | 10.62 | 10.04 | 9.22 | 7.74 | 4.87 | | | | | | | | |
| | $y_h(f_s)$ | 14.32 | 14.18 | 13.94 | 13.74 | 13.44 | 12.91 | 11.89 | 8.66 | 7.02 | 5.75 | | | | | |
| | $y_{max}(f_s)$ | 0.43 | 0.72 | 1.26 | 1.82 | 2.76 | 4.86 | 4.87 | 8.66 | 7.02 | 5.75 | | | | | |
| | $y$ | | | 0.39 | 1.82 | 2.76 | 4.86 | 4.87 | 8.66 | 7.02 | 5.75 | 36.3 | 14.7 | 21.6 | 99.5 | Green |
| Result output parameter | Performance | After the adjustment of the continuous casting secondary cooling process parameters (i.e., intensifying a total flow of secondary cooling water or reducing a casting speed), the solidification end point of the continuous casting bloom is located between $7^\#$ and $8^\#$ rollers. Under this production condition, preset reduction amounts are $Y_{TOT}$=36.3 mm, $Y_S$=14.7 mm, and $Y_H$=21.6 mm. actual reduction amounts of reduction rollers and a distribution of a total reduction amount thereof are calculated online in real time. That is, $3^\#$-$7^\#$ rollers perform five-roller soft reduction, and $8^\#$-$10^\#$ rollers perform three-roller heavy reduction. With the alerting coefficient h of 99.5%>95%, the total reduction amount reaches the predetermined target, the performing results are output online. | | | | | | | | | | | | | | |

FIG. 10

ONLINE COOPERATIVE CONTROL METHOD FOR SOFT REDUCTION AND HEAVY REDUCTION IN BLOOM CONTINUOUS CASTING

CROSS REFERENCE TO RELATED APPLICATION

This patent application claims the benefit and priority of Chinese Patent Application No. 202310386036.7, filed with the China National Intellectual Property Administration on Apr. 12, 2023, the disclosure of which is incorporated by reference herein in its entirety as part of the present application.

TECHNICAL FIELD

The present disclosure relates to the technical field of steel continuous casting, and provides an online cooperative control method for soft reduction and heavy reduction in bloom continuous casting which can be used for online cooperative control and optimization of a reduction process for a large-size continuous casting bloom. This method may also be applied to continuous casting reduction processes for billets, slabs or the like.

BACKGROUND

Center segregation and shrinkage porosity are one of typical quality flaws and a significant cause of a low ratio of acceptable large-size continuous casting blooms. One important technical means to solve the center segregation and the shrinkage porosity of a large-size product is to carry out soft reduction and heavy reduction in a continuous casting procedure. It has been hard to meet customer quality requirements for large-size continuous casting blooms by using a single soft reduction or heavy reduction process. For a particular working condition of continuous casting, while a simple combination of soft reduction and heavy reduction may be capable of improving the quality of a continuous casting bloom to a certain extent, there are a series of problems, such as difficult cooperative regulation and control, inconvenient online real-time adjustment, lack of theoretical guidance and poor applicability in a production site. Key problems of online cooperative control of soft reduction and heavy reduction are how to accurately determine the ultimate reduction amount at each position within a reduction zone, how to calculate reduction zones of soft reduction and heavy reduction online in real time, how to calculate and distribute a reduction amount for each reduction roller in real time, how to output the number and roller Nos. of reduction rollers, and the like. In order to adapt to the production, research and development of large-size high-quality steel products, there is an urgent need to find a scientific and effective, accurate and stable, simple and quick online cooperative control method for soft reduction and heavy reduction in continuous casting so as to lay the foundation for the research and development of a dynamic reduction process model for bloom continuous casting and the improvement of an intelligent control level of a reduction process.

By searching for related studies on techniques of soft reduction and heavy reduction in continuous casting using a patent search engine, the following main directly related patented techniques are found: (1) in patent "a combined reduction method for a continuously cast blank" (CN201911101751.1), reduction zones of soft reduction and heavy reduction are divided by a critical solid fraction m ultimately formed through segregation and a critical solid fraction n initially formed through porosity; and soft reduction is carried out within a zone of $f_s<m$ while heavy reduction is carried out by using a single roller within a zone of $f_s>n$. This patent gives exact reduction zones of soft reduction and heavy reduction, but does not provide a theoretical basis for the distribution of an actual reduction amount for each reduction roller and also does not take into consideration a device reduction capability, which may be not conducive to debugging of a continuous casting reduction process model on the spot with limited applicability. (2) In patent "a method for improving internal quality of a continuously cast high-carbon steel bloom" (CN201811578543.6), a reduction zone is determined by a solid fraction calculated with a distance between a liquid phase point and a solid phase point, and a reduction amount of each reduction roller is determined according to the solid fraction, a total reduction amount and a coefficient k within the reduction zone. However, this patent does not provide a source and a basis of the coefficient k, and fails to assess a distribution principle of reduction amounts for reduction rollers and to realize online cooperative regulation and control of soft reduction and heavy reduction. (3) In patent "a method for determining a reduction process capable of improving internal quality of a pinion steel" (CN202110589729.7), deformations of a surface of a cast blank and a liquid core during a reduction process are calculated by a thermal/mechanical coupling model; reduction efficiency η is obtained; and a reduction amount of a liquid core and a surface reduction amount required by this steel type are calculated within the reduction zone. The reduction efficiency η is not calculated when the reductions exceed the reduction zone and reach a solidification zone, and the reduction amounts are limited by the capability of a field device. This patent allows for the calculation of the reduction amounts through thermal/mechanical coupling simulation, but does not focus on problems resulting from internal and surface cracks of the continuously cast blank and does not solve the problem that a crack defect may possibly occur in the cast blank from the root. Moreover, the device reduction capability is directly given according to a situation in the field and cannot be quantitatively considered online according to the real-time thermal state of the cast blank. The universality is limited. (4) In patent "an online control method for a reduction amount of dynamic soft reduction in bloom continuous casting" (CN200910187338.1), a reduction amount of a continuous casting bloom is calculated with a reduction amount of a liquid core and reduction efficiency, and a clearance between rollers is adjusted. However, the calculation of the reduction amount in this patent is only based on a basic principle that center segregation and porosity can only be eliminated by compensating the solidification contraction of the liquid core with a reduction amount of soft reduction, with no direct simulation analysis on complex deformation and stress conditions of the continuous casting bloom in a continuous casting production state. Whether cracks will occur within and on the surface of the continuous casting bloom is not considered, which is not conducive to achieving a reliable and stable soft reduction effect. Situations of heavy reduction cannot be considered as well.

In view of the shortcomings of the prior art, the present disclosure comprehensively considers the cracking sensitivity of continuous casting bloom and device capacity change under different thermal states through the simulation of ABAQUS finite element method, and directly obtains the scientific and accurate quantitative relationship between the theoretical ultimate reduction amount and reduction position, which can ensure the reduction effect and avoid cracks of the continuous casting bloom. According to the real-time equivalent central solid fraction of continuous casting bloom and theoretical ultimate reduction amount of each roller, the present disclosure provides an online cooperative control method for soft reduction and heavy reduction in bloom continuous casting, which realizes the real-time calculation and distribution of the actual reduction amount of each roll under soft/heavy reduction, online output of actual reduction amount, number of rolls and roll Nos. Clearly, the content of the present invention has potential theoretical guidance and foundation in the development and practical production application of dynamic reduction process models for continuous casting.

SUMMARY

An objective of the present disclosure is to provide an online cooperative control method for soft reduction and heavy reduction in bloom continuous casting, which is a scientific and effective, accurate and stable, simple and quick control method for solving defects such as center segregation and porosity of a large-scale continuous casting bloom.

The main content of the present disclosure is described below.

1) Establishment of an offline three-dimensional solidification and heat transfer model for a continuous casting bloom and calculation of three-dimensional temperature fields of continuous casting blooms of different steel types in which:

Produced steel types are classified; and thermophysical parameters such as a liquidus/solidus temperature, a density, specific heat, a heat conductivity coefficient and latent heat of solidification are collected from the steel types. The offline three-dimensional solidification and heat transfer model for a continuous casting bloom is established according to structural parameters of a continuous casting machine and a secondary cooling water distribution. Three-dimensional temperature fields of continuous casting blooms of different steel types are calculated according to the offline three-dimensional solidification and heat transfer model for a continuous casting bloom.

2) Establishment of a three-dimensional reduction model for a continuous casting bloom under thermo-mechanical coupling and simulation of a reduction process of a continuous casting bloom in a different thermal state, in which:

A force condition of a continuous casting bloom during reduction is analyzed, and a geometric model for a reduction process of a continuous casting bloom is established by using ABAQUS finite element software. Numerical calculation of the reduction process of the continuous casting bloom is performed in a sequential coupling manner. That is, firstly the three-dimensional temperature fields of the continuous casting blooms calculated in step 1) are imported to the geometric model for heat transfer calculation; a calculation result is then coupled into the three-dimensional reduction model for a continuous casting bloom; and finally, simulation calculation of the reduction process of the continuous casting bloom under thermo-mechanical coupling is performed.

A reduction position of the continuous casting bloom may be denoted by an equivalent central solid fraction $f_s$, and the equivalent central solid fraction of the continuous casting bloom is: $f_s=(T_l-T_c)/(T_l-T_s)$, where $T_l$ represents a liquidus temperature; $T_s$ represents a solidus temperature; and $T_c$ represents a center temperature of the continuous casting bloom. It should be noted that the equivalent central solid fraction $f_s$ in the present disclosure may be greater than 1, and $f_s>1$ indicates that the continuous casting bloom has been completely solidified. A reduction process in which a different reduction amount y is applied to the continuous casting bloom at a different reduction position may be simulated by using the three-dimensional reduction model for a continuous casting bloom under thermo-mechanical coupling, and stress and strain distributions on a reduction roller and the continuous casting bloom are obtained.

3) Determination of a maximum reduction amount of the continuous casting bloom in a different thermal state with consideration of a device reduction capability in which A stress value on the reduction roller and a grid area are directly read to calculate a reduction force according to the stress distribution on the reduction roller at different reduction positions of the continuous casting bloom in step 2). A quantitative relationship $F_s(y, f_s)$ of a reduction force to a reduction amount in soft reduction and a quantitative relationship $F_h(y, f_s)$ of a reduction force to a reduction amount in heavy reduction with different equivalent central solid fractions are obtained by analyzing results of applying different reduction amounts at different reduction positions of the continuous casting bloom. A guidance is provided for a design of the device reduction capability according to $F_s(y, f_s)$ and $F_h(y, f_s)$. According to the designed actual reduction capabilities (i.e., $F_s=A$, $F_h=B$) of the devices for soft reduction and heavy reduction, a maximum reduction amount $y_s'(f_s)$ of the device for soft reduction at a different position and a maximum reduction amount $y_h'(f_s)$ of the device for heavy reduction at a different position are determined.

4) Determination of a maximum reduction amount in a different thermal state with consideration of a cracking susceptibility of the continuous casting bloom in which A maximum strain $\varepsilon_{max}(y, f_s)$ of a cracking susceptible region (a region in which cracking may occur most easily on the cross section of the whole continuous casting bloom, i.e., a region corresponding to $f_s=0.9-1.0$) of the continuous casting bloom in each working condition is read according to the stress and strain distributions of the continuous casting bloom obtained in step 2), and a relative magnitude between the maximum strain and a critical strain $\varepsilon_{cri}$ is determined. A quantitative relationship $y_s(f_s)$ of a maximum reduction amount to a reduction position without internal cracking in the continuous casting bloom under soft reduction is obtained from the relative magnitudes between the maximum strains in a series of working conditions and the critical strain. For a heavy reduction process, a maximum cracking index $\psi_{max}(y, f_s)$ of the continuous casting bloom in a series of working conditions is calculated from a relationship of a stress to a tensile strength of a steel type according to a stress distribution on the continuous casting bloom in a series of working conditions; and a quantitative relationship $y_h(f_s)$ of a maximum reduction amount to a reduction position without surface cracking and corner cracking in the continuous casting bloom during heavy reduction is obtained according to a magnetite of the cracking index.

5) Determination of a theoretical ultimate reduction amount with overall consideration of the cracking susceptibility of the continuous casting bloom and the device reduction capability in which A theoretical ultimate reduction amount $y_{max}(f_s)$ at a different reduction position within an entire reduction region is obtained on the basis of taking the cracking susceptibility of the continuous casting bloom and the device reduction capability into overall consideration according steps 3) and 4):

$$y_{max}(f_s) = \text{Min} \begin{cases} k_1 \times y'_s(f_s) & 0.3 \leq f_s \leq f_{s,n} \\ k_2 \times y'_h(f_s) & 0.3 \leq f_s \leq f_{s,m} \\ k_3 \times y_s(f_s) & 0.3 \leq f_s \leq 1.0 \\ k_4 \times y_h(f_s) & 1.0 < f_s \leq f_{s,m} \end{cases} \quad (1)$$

where $f_{s,n}$ and $f_{s,m}$ represent corresponding equivalent central solid fractions of the continuous casting bloom at positions of the nth pair of reduction rollers and the mth pair of reduction rollers of the continuous casting machine, respectively, where n is the total number of soft reduction rollers, and m is the total number of pairs of reduction rollers. $k_1$, $k_2$, $k_3$ and $k_4$ are regulation coefficients, of which initial values are all 1 and of which values may be slightly adjusted around 1 to adapt to a production field. The regulation coefficients $k_1$, $k_2$, $k_3$ and $k_4$ are provided for the following purposes: (1) on the basis of following a changing law or relationship of the theoretical ultimate reduction amount and the reduction position of the continuous casting bloom in different thermal states, an error caused by changes in device state and process parameters is taken into consideration, and simple and rapid real-time error adjustment and correction are realized, ensuring a more reliable and stable reduction effect; (2) a parameter interface for debugging is reserved, which is adaptable to complex and changing production fields and convenient for debugging and production application of field software and production tests; and (3) for a same class of steel types, when a specific produced steel type changes, a result of the current steel type may be used as initial data for debugging for a new steel type to a certain extent.

6) Establishment of an online three-dimensional solidification and heat transfer calculation model for the continuous casting bloom and real-time calculation of a thermal state of the continuous casting bloom, in which:

On the basis of the offline three-dimensional solidification and heat transfer calculation model for the continuous casting bloom, the continuous casting bloom is divided into small slices in a casting direction by a crystallizer according to a time step and a casting speed. The slices are continuously updated at a meniscus of the crystallizer and injected into the crystallizer, and solidified and cooled slices continuously leave from a shear point. During a process from the slices entering the crystallizer to leaving from the shear point, changes in cooling boundary condition and temperature field experienced by each slice during continuous casting are calculated and recorded online with the model using an array storage method, whereby real-time changes in the thermal state of the continuous casting bloom and a solidification end position are accurately determined. Simulation calculation is performed on a real-time three-dimensional temperature field distribution of the continuous casting bloom and the equivalent central solid fraction of the continuous casting bloom according to the established online three-dimensional solidification and heat transfer calculation model for the continuous casting bloom.

7) Real-time calculation of relative positions of soft reduction and heavy reduction zones and a total reduction amount of the continuous casting bloom, in which:

Changes in relative positions of soft reduction and heavy reduction zones during continuous casting have an important influence on final implementation of soft reduction and heavy reduction processes and may be calculated. A relative position of a soft reduction zone ($0.3 \leq f_s \leq 1.0$) and a relative position of a heavy reduction zone ($1.0 \leq f_s \leq f_{s,m}$) may be calculated in real time according to the online three-dimensional solidification and heat transfer calculation model for the continuous casting bloom established in step 6).

Natural shrinkage of the continuous casting bloom changes with changing working conditions, resulting in unstable target thickness and metallurgical reduction effect of the continuous casting bloom. To promote and/or guarantee stable target thickness and metallurgical reduction effect of the continuous casting bloom, a natural shrinkage amount b(t) of the continuous casting bloom is calculated in real time with the online three-dimensional solidification and heat transfer calculation model for a continuous casting bloom. A total reduction amount $Y_{TOT}$ is determined by a relationship of a sectional thickness a of the crystallizer to the natural shrinkage amount b(t) of the continuous casting bloom and a target thickness c of the continuous casting bloom, namely $Y_{TOT}(t)=a-b(t)-c$; a set initial total soft reduction amount is: $Y_S$=2-4% a, and a set initial total heavy reduction amount is: $Y_H(t)=Y_{TOT}(t)-Y_S$. When implementing online cooperative control of soft reduction and heavy reduction, limited by a device, a reduction zone and a final reduction effect, $Y_{TOT}(t)$, $Y_S$ and $Y_H(t)$ may be adjusted appropriately in real time as needed. When an actual total soft reduction amount $Y_{S,\ Pract}$ is smaller than the set initial total soft reduction amount $Y_S$, the initial total heavy reduction amount is: $Y_H(t)=Y_{TOT}(t)-Y_{S,\ Pract}$.

8) Online cooperative control of soft reduction and heavy reduction in continuous casting process and online output of performing results, which may include: real-time calculation and distribution of actual reduction amounts of rollers for soft reduction and heavy reduction, online output of the numbers and roller Nos. of reduction rollers for soft reduction and heavy reduction, and real-time calculation of an alerting coefficient h and information feedback.

A point (e.g., a critical point) of a built-in logic and an embodiment of the real-time calculation and distribution of actual reduction amounts of the rollers for soft reduction and heavy reduction lies in determining the last pair of reduction rollers for performing soft reduction according to step 7) and denoting a roller No. as i. In combination with steps 5) and 6), a theoretical ultimate reduction amount of each reduction roller is calculated in real time; a reduction amount is distributed for each roller for soft reduction forwards one by one, and a reduction amount is distributed for each roller for heavy reduction backwards one by one. It should be noted that real-time theoretical ultimate reduction amounts $y_k$ and $y_p$ of a first pair of reduction rollers for performing soft reduction (with a roller No. denoted by k) and a last pair of reduction rollers for performing heavy reduction (with a roller No. denoted by p) are respectively as follows:

$$y_k = \begin{cases} y_{max}(f_{s,k}) & \sum_{k}^{i} y_{max}(f_{s,i}) < Y_S \\ Y_S - \sum_{k+1}^{i} y_{max}(f_{s,i}) & \sum_{k}^{i} y_{max}(f_{s,i}) \geq Y_S \end{cases} \quad (2)$$

$$y_p = \begin{cases} y_{max}(f_{s,p}) & \sum_{k}^{p} y_{max}(f_{s,i}) < Y_H(t) \\ Y_H(t) - \sum_{i}^{p-1} y_{max}(f_{s,i}) & \sum_{i}^{p} y_{max}(f_{s,i}) \geq Y_H(t) \end{cases} \quad (3)$$

where $f_{s,k}$ and $f_{s,p}$ represent corresponding equivalent central solid fractions of the continuous casting bloom at positions of the first pair of reduction rollers for performing soft reduction and the last pair of reduction rollers for performing heavy reduction, respectively. The actual reduction amounts of the rollers for soft reduction and heavy reduction calculated in real time above, and the numbers and roller Nos. of the reduction rollers are output on line.

Real-time calculation may be performed on the alerting coefficient h according to the actual reduction amounts of the rollers for soft reduction and heavy reduction output online, where the alerting coefficient is: $h=Y_{pract}/Y_{TOT}\times 100\%$, and $Y_{pract}$ represents an actual total reduction amount calculated according to an online output result. If h>95%, an alerting level is green, indicating that the actual reduction amount substantially reaches a set total reduction amount and production runs normally; if the alerting coefficient h≤95%, the alerting level is red, and at this time, an online cooperative control system may feed back information to a continuous casting secondary cooling control system to adjust and optimize continuous casting secondary cooling process parameters. After the continuous casting secondary cooling process parameters are adjusted, a real-time thermal state and a solidification end point position of the continuous casting bloom may be calculated in real time with the online three-dimensional solidification and heat transfer calculation model for a continuous casting bloom; steps 6)-8) are then repeated until the alerting coefficient h>95%; and finally, the actual reduction amounts of the rollers for soft reduction and heavy reduction, and the number and roller Nos. of the reduction rollers are output again.

The present disclosure has at least the following beneficial effects.

1. The present disclosure takes into overall consideration changes in the cracking susceptibility of the continuous casting bloom and the device reduction capability in different thermal states and obtains the accurate and scientific quantitative relationship of theoretical ultimate reduction amount versus reduction position, which ensures the significant reduction effect and avoids the cracks of continuous casting bloom and the damage of the device at the same time.

2. Combining the quantitative relationship between theoretical ultimate reduction amount versus reduction position, the present disclosure adopts a three-dimensional solidification heat transfer online model to calculate in real-time the evolution of the bloom thermal state during the continuous casting process, which realizes the real-time calculation and distribution of the actual reduction amount of each roll under soft/heavy reduction, online output of actual reduction amount, number of rolls and roll Nos, and real-time calculation of the alerting coefficient h and information feedback.

3. The present disclosure receives for accurate and scientific determination of quantitative relationships between the reduction force of roller, the reduction position and reduction amount during soft/heavy reduction by three-dimensional reduction model under thermo-mechanical coupling for continuous casting bloom, which may provide the basis and guidance for device design. Based on the online three-dimensional solidification and heat transfer model, the real-time thermal state of the continuous casting bloom at the different position of reduction rolls can be simulated, which in turn quantitatively takes into account the changes of the devices reduction capacity during soft/heavy reduction.

4. Based on the evolution rule about theoretical ultimate reduction amount of continuous casting bloom in different thermal states, the present disclosure considers the error caused by device state and process parameters fluctuations, to achieve the simple and rapid real-time error adjustment and ensuring a more reliable and stable reduction effect. Moreover, the parameter interface for debugging is reserved to adapt to the complex and changeable production site, which is able to complete software debugging and production testing.

BRIEF DESCRIPTION OF THE DRAWINGS

FIGS. 7A, 7B, and 7C are schematic diagrams illustrating the relationship between theoretical ultimate reduction amount $y_{max}(f_s)$ and reduction position $f_s$ with overall consideration of the continuous casting bloom cracking susceptibility and the device reduction capability, in which FIG. 7A shows the normal production situation, FIG. 7B shows the production situation where the solidification end point is near the front, and FIG. 7C shows the production situation where a solidification end point is near the back;

FIG. 10 illustrates initial calculation results and final calculation results after adjustments to the continuous casting second cooling process of online cooperative control method for soft reduction and heavy reduction in bloom continuous casting, respectively.

DETAILED DESCRIPTION OF THE EMBODIMENTS

Figure 1A:
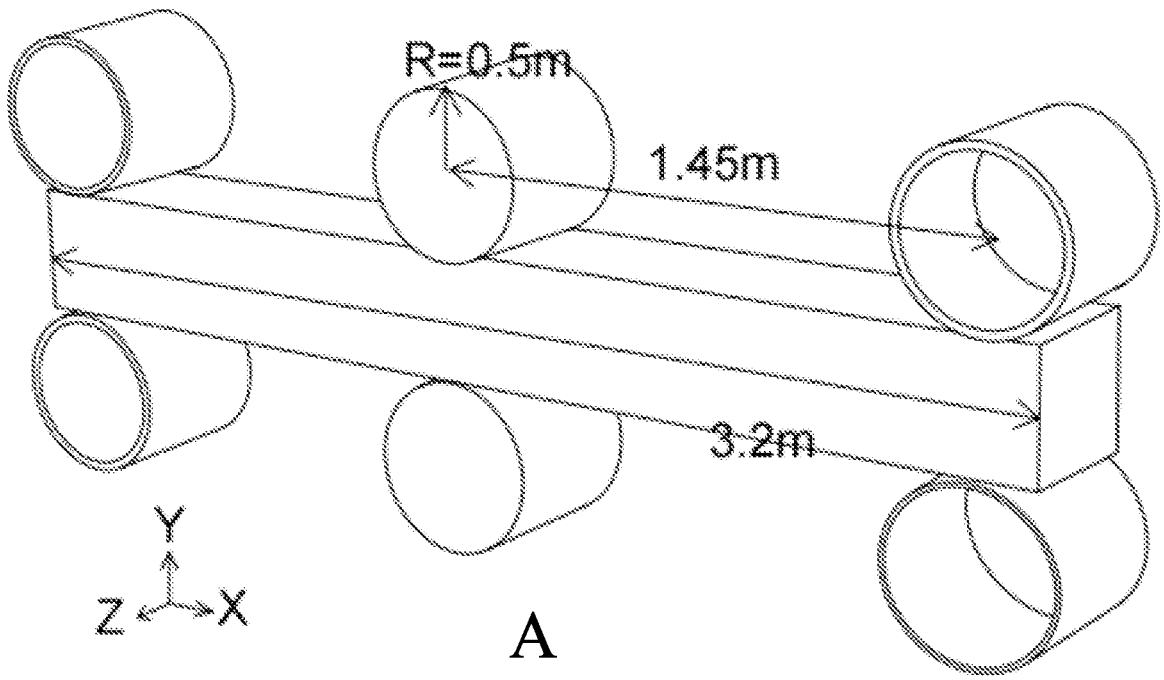
FIG. 1A and FIG. 1B are schematic diagrams of the three-dimensional reduction model under thermo-mechanical coupling for continuous casting bloom and the typical feature surface, respectively (section dimensions: 420 mm×530 mm; steel type: GCr15 steel)

The present disclosure provides an online cooperative control method for soft reduction and heavy reduction in bloom continuous casting. The present disclosure will be described clearly and completely in conjunction with the accompanying drawings and an example.

Specifically, the following steps are included.

1) An offline three-dimensional solidification and heat transfer model for a continuous casting bloom of a different class of steel types is established according to key information such as major parameters (section dimensions, an effective length of a crystallizer, a length of each secondary cooling zone, an arrangement and a model number of nozzles, a specific water flowrate, etc.) of a continuous casting machine, boundary conditions (an initial boundary condition, a boundary condition of the crystallizer, a heat transfer boundary condition between spray water and a surface of a continuous casting bloom, heat transfer boundary conditions of a radiation zone and an air cooling section, etc.) and thermophysical parameters (including a liquidus/solidus temperature, a density, specific heat, a heat conductivity coefficient, latent heat of solidification, etc.) of a steel type, and a three-dimensional temperature field information of a continuous casting bloom in an entire continuous casting process is calculated.

2) A three-dimensional temperature field of a continuously continuous casting bloom is subjected to coordinate transformation and then imported to a three-dimensional reduction model for a continuously continuous casting bloom under thermo-mechanical coupling established by ABAQUS finite element software. A heat transfer process of the continuously continuous casting bloom is calculated with an ABAQUS heat transfer module, and then stress and strain distributions and changes on the continuously continuous casting bloom and a reduction roller in a whole reduction process are simulated.

Specifically, (1) a complete temperature field of the continuous casting bloom from an outlet of the crystallizer to a shear position domain is calculated with the offline three-dimensional solidification and heat transfer model for a continuously continuous casting bloom. Temperature field information of an appropriate length (which is determined according to a specific working condition with a need to ensure that a temperature at the position of a reduction roller for performing reduction is consistent with a temperature in a simulated specific working condition) is selected. After coordinate transformation, the three-dimensional temperature field is imported to the ABAQUS heat transfer module, and assigned with a value on the model. (2) In the three-dimensional reduction model for a continuously continuous casting bloom under thermo-mechanical coupling, to simplify calculation, an actual continuous casting reduction process is simulated by a relative movement of reduction on the surface of the continuous casting bloom. That is, a motion state of the reduction roller is reduction first and then movement. Since stress and strain distributions of the continuous casting bloom are directly related to the temperature, to ensure that accurate stress and strain information of the continuous casting bloom can be obtained finally, a temperature drop of the continuous casting bloom needs to be considered during the movement of the reduction roller, thus guaranteeing that a central solid fraction of the continuous casting bloom below the reduction roller always remains unchanged when the reduction roller moves, which is equivalent to the case where the reduction position of the reduction roller is constant in practical production. Self-consistent difference calculation is performed on temperatures of slices of the cross section of the continuous casting bloom with the heat transfer model in the ABAQUS software, ensuring that temperatures cover the entire continuous casting bloom. (3) A calculation result of the ABAQUS heat transfer model is imported as a predefined field to the three-dimensional reduction model for a continuously continuous casting bloom under thermo-mechanical coupling, and simulation calculation is performed on stress and strain. After setting an analysis step and ensuring the completion of reduction by the reduction roller, i.e., when the reduction roller starts to move, the calculation result of the heat transfer model is read, ensuring that a movement time of the reduction roller remains consistent with a heat transfer calculation time. (4) A reduction working condition where a different reduction amount is implemented at a different reduction position by using the three-dimensional reduction model for a continuously continuous casting bloom under thermo-mechanical coupling, and stress and strain distributions on the reduction roller and the continuously continuous casting bloom in a different working condition (i.e., a different reduction amount y is applied at a position $f_s$ with a different central solid fraction of the continuously continuous casting bloom) are obtained.

Figure 1B:
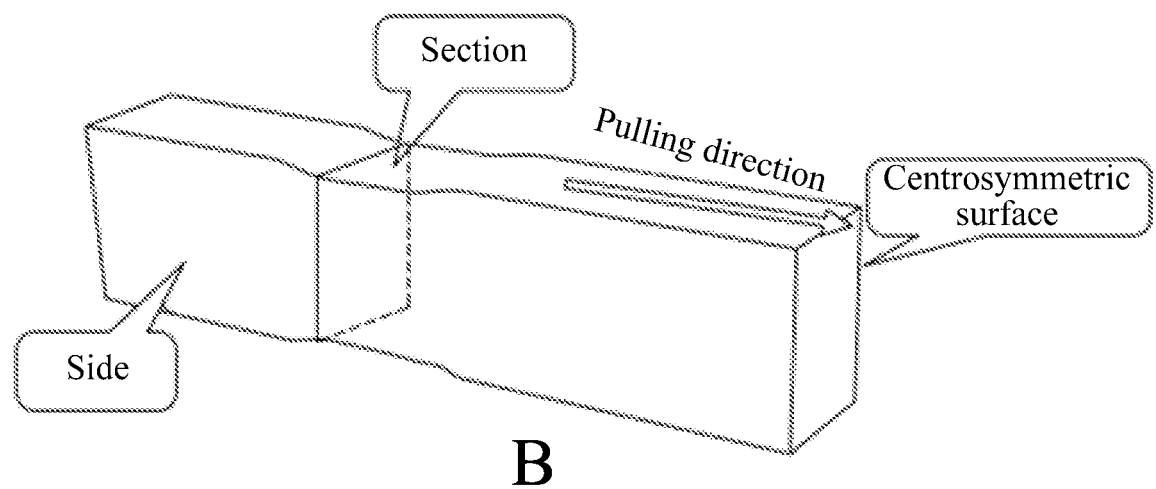

A schematic diagram of the established three-dimensional reduction model for a continuously continuous casting bloom under thermo-mechanical coupling and a typical feature surface is as shown in FIG. 1. The simulated section dimensions are 420 mm×530 mm; the steel type is GCr15 steel; and a casting speed is 0.5 m/min. A series of typical working conditions (reduction position: $f_s$=0.3-2.5; reduction amounts: 1-10 mm for soft reduction and 5-30 mm for heavy reduction) are simulated, and the stress and strain distributions on the reduction roller and the continuously continuous casting bloom in each working condition are analyzed.

Figure 2A:
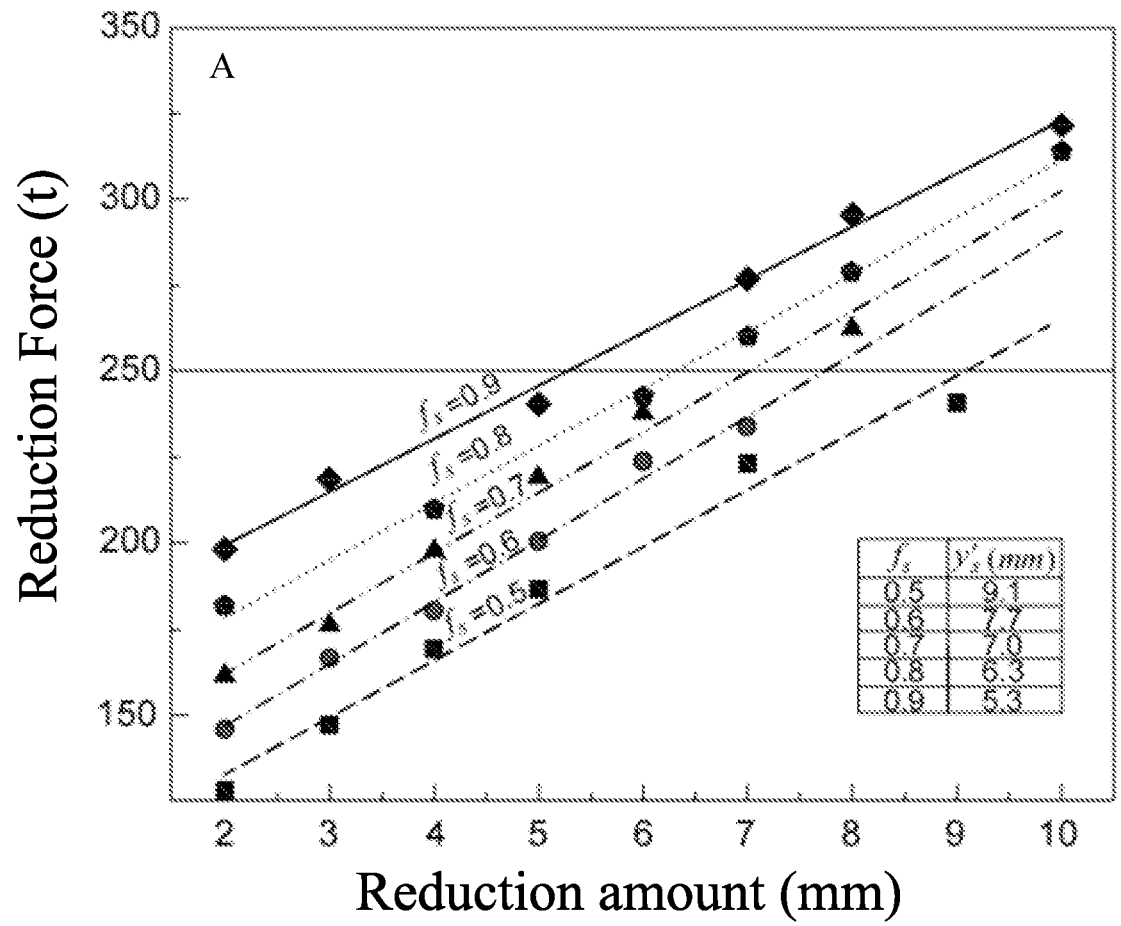
FIG. 2A illustrates the quantitative relationship between reduction force F of roller and reduction amount y in a series of typical soft reduction conditions.
Figure 2B:
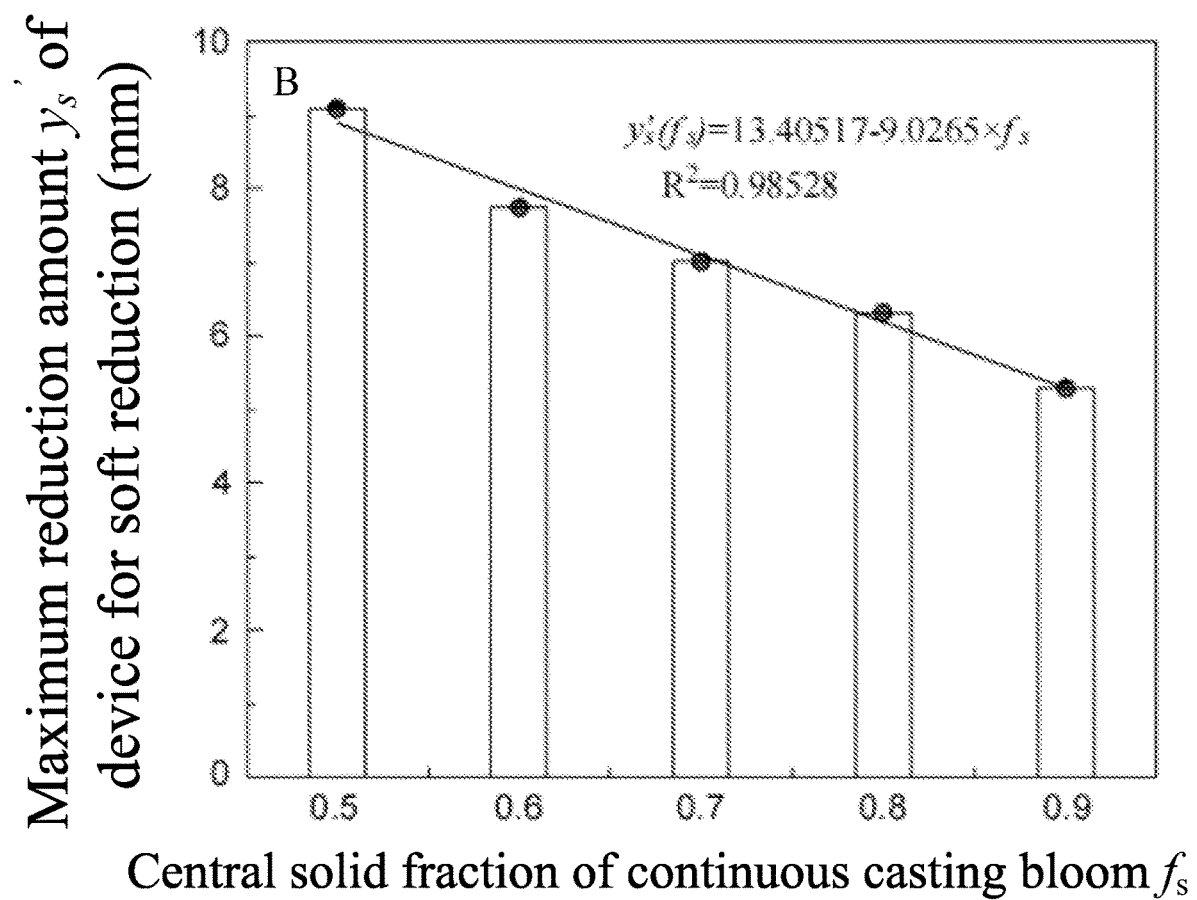
FIG. 2B represents the maximum reduction amount $y_s'(f_s)$ versus the reduction position $f_s$ during the soft reduction conditions, which the reduction force of roller is designed for 250 t in practical production.
Figure 3A:
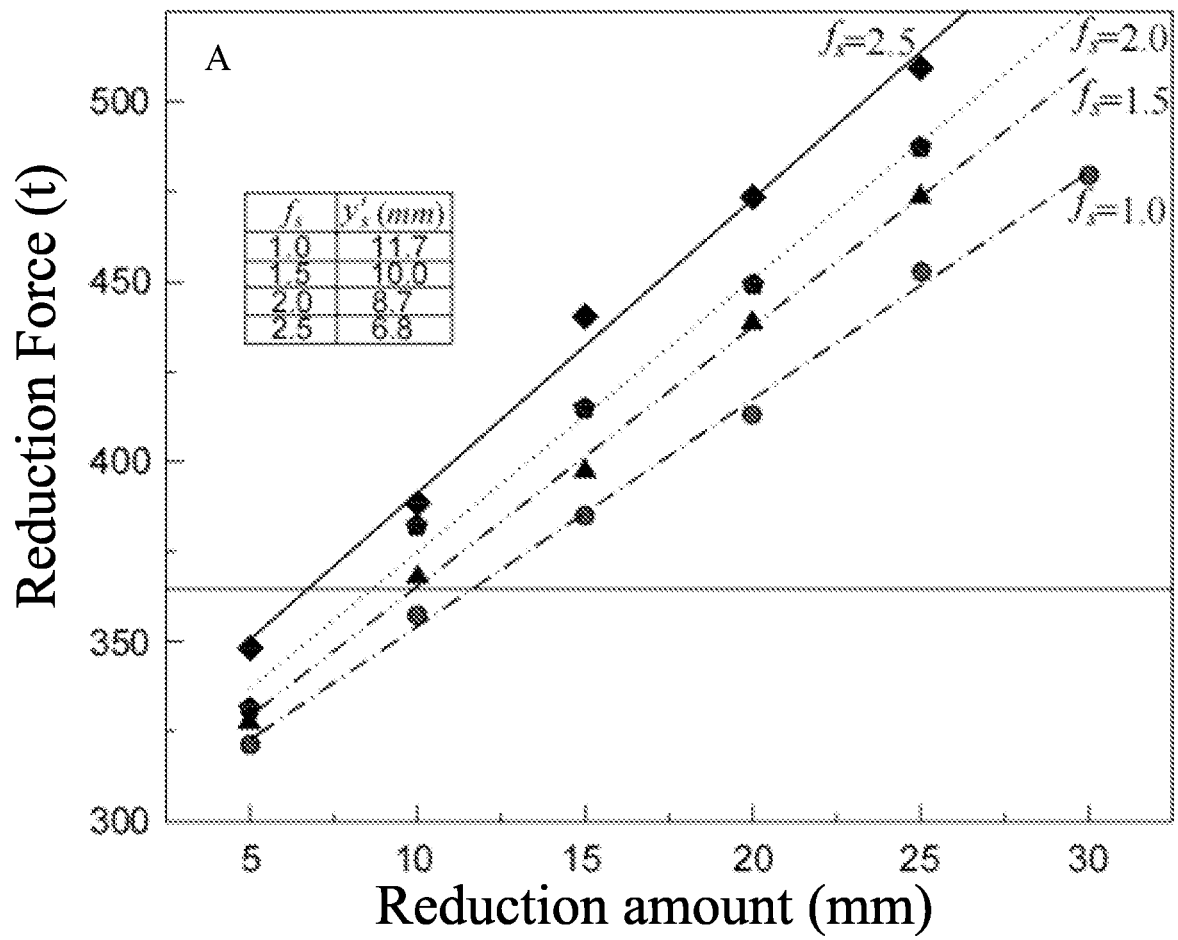
FIG. 3A illustrates the quantitative relationship between reduction force $F_h$ of roller and reduction amount y in a series of typical heavy reduction conditions.
Figure 3B:
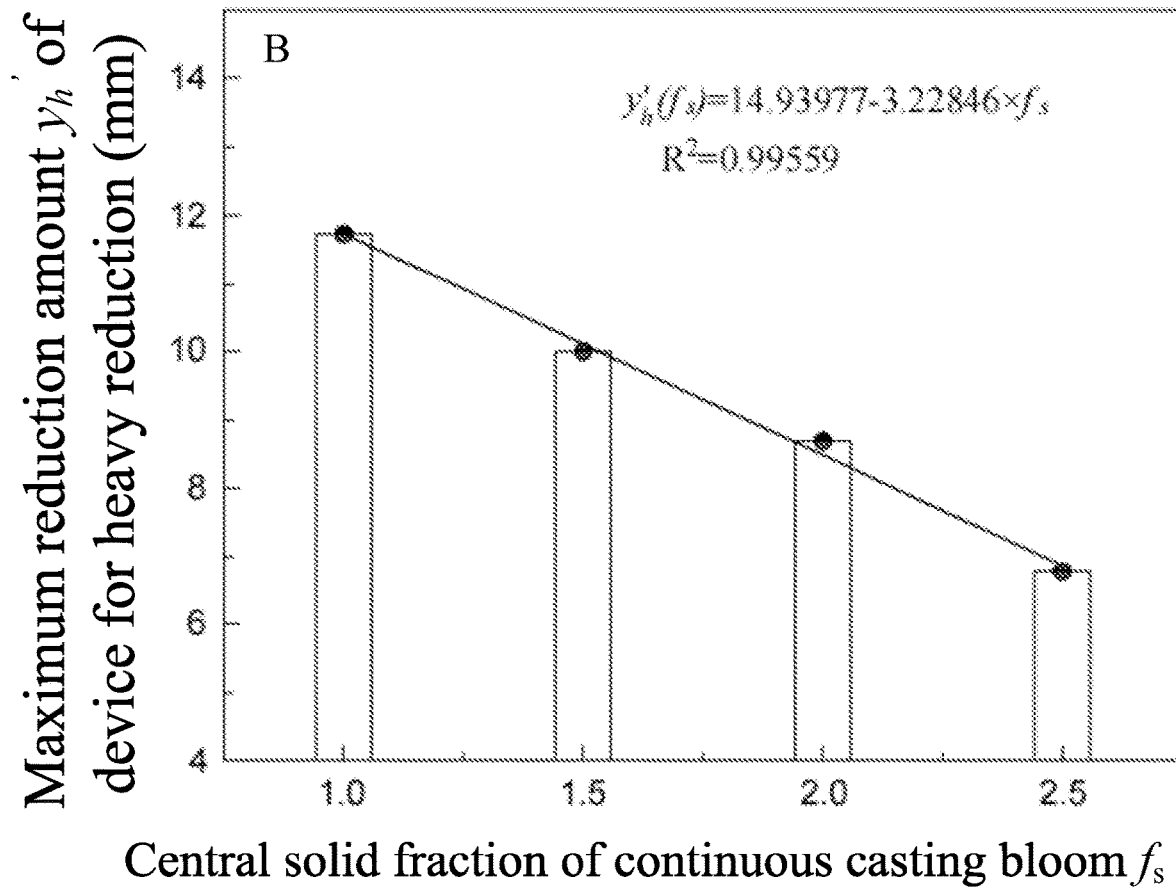
FIG. 3B represents the maximum reduction amount $y_h'(f_s)$ versus the reduction position $f_s$ during the heavy reduction conditions, which the reduction force of roller is designed for 365 t in practical production.

3) An equivalent stress distribution on the reduction roller in each working condition is analyzed by simulating the above series of typical working conditions. An equivalent stress on each grid node is extracted, and a reduction force in each working condition is calculated in combination with a contact area of the reduction roller and the continuously continuous casting bloom. At a different reduction position, a relationship of a reduction force of the reduction roller for soft reduction to a reduction amount is as shown in FIG. 2A, and a relationship of a reduction force of the reduction roller for heavy reduction to a reduction amount is as shown in FIG. 3A. The calculation results in this section may provide reference and guidance for a design of a device reduction capability. In an actual new project of a steel mill, it is designed that the reduction force of the reduction roller for soft reduction is 250 tons and the reduction force of the reduction roller for heavy reduction is 365 tons. With such a reduction capability, the maximum reduction amounts of the devices for soft reduction and heavy reduction at different reduction positions are as shown in FIG. 2B and FIG. 3B, i.e., $y_s'(f_s)=13.40517-9.02650 \times f_s$ and $y_h'(f_s)=14.93977-3.22846 \times f_s$, which are in the form of a linear function. Therefore, changes of the maximum reduction amounts $y_s'(f_s)$ and $y_h'(f_s)$ in different thermal states of the continuous casting bloom with consideration of the reduction capability of the device may be quantitatively considered in real time according to an online three-dimensional solidification and heat transfer calculation model for a continuous casting bloom, i.e., $y_s'(f_s)=a_1+b_1 \times f_s$ ($0.3 \leq f_s \leq f_{s,n}$) and $y_h(f_s)=a_2+b_2 \times f_s$ ($0.3 \leq f_s \leq f_{s,m}$), where $a_1$, $b_1$, $a_2$ and $b_2$ are regression coefficients, which need to be determined jointly by simulation results in a series of typical working conditions and actually designed reduction forces $F_s$ and $F_h$ for the devices.

Figure 4A:
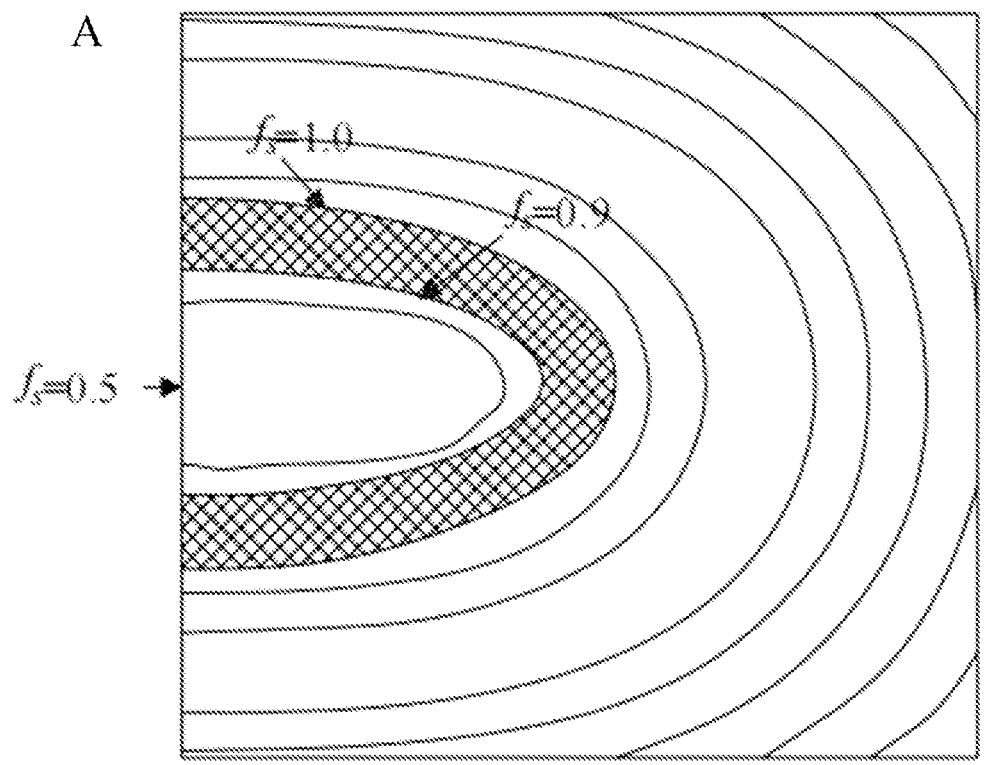
FIG. 4A shows a schematic diagram of the cracking sensitive zone on the cross-section of a continuous casting bloom during soft reduction (taking for example $f_s=0.5$ at the reduction position).
Figure 4B:
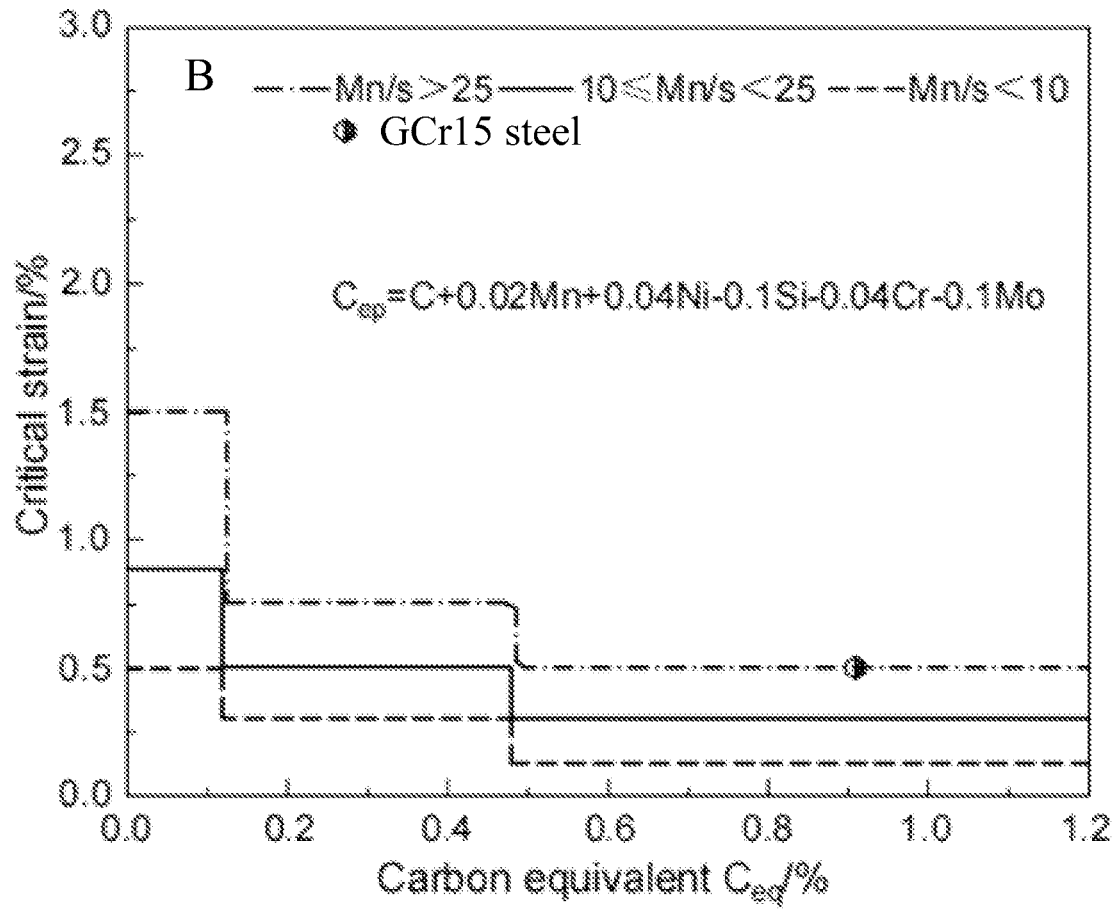
FIG. 4B shows the value of critical strain $\varepsilon_{cri}$ for GCr15 steel.
Figure 5A:
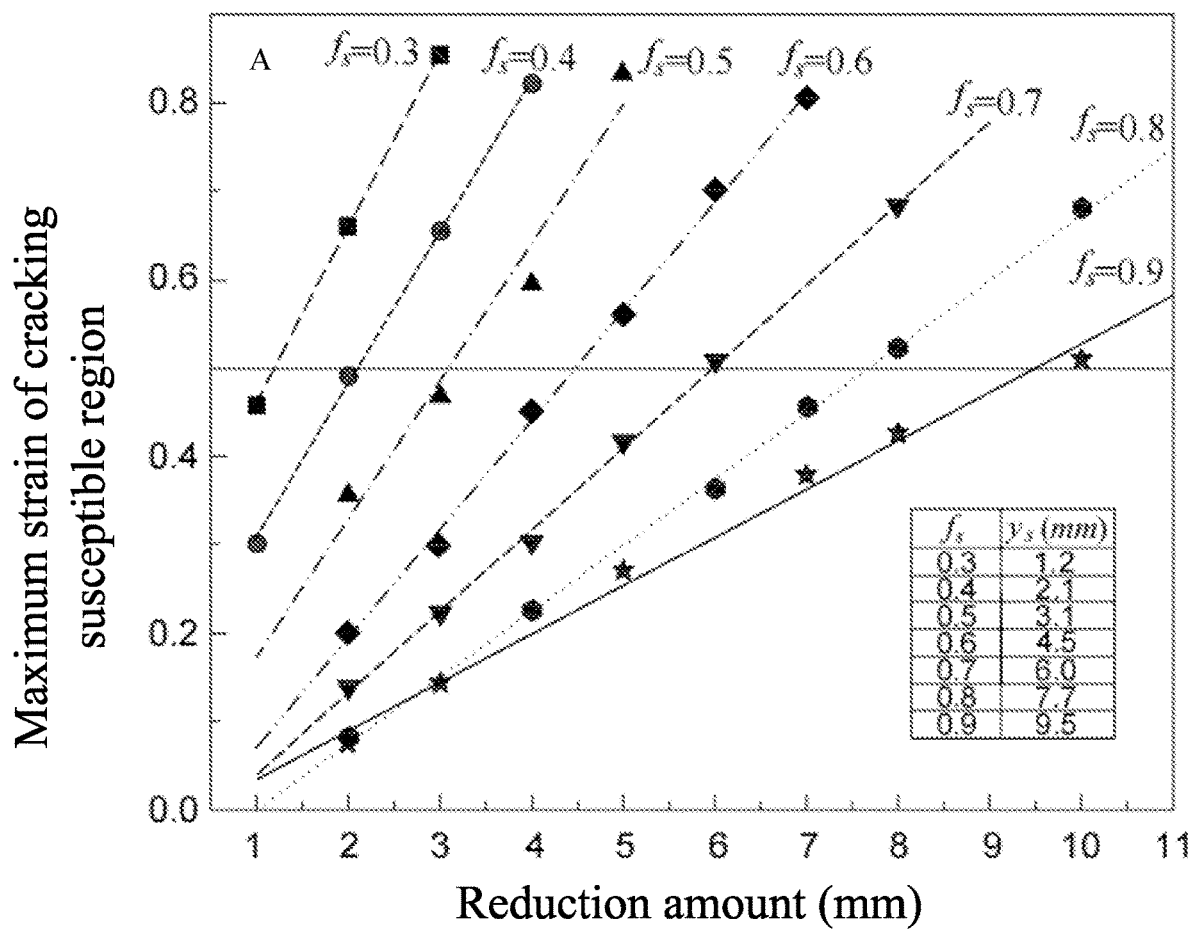
FIG. 5A illustrates the quantitative relationship between maximum strain $\varepsilon_{max}(y, f_s)$ of cracking sensitive zone and reduction amount y in a series of typical soft reduction conditions.
Figure 5B:
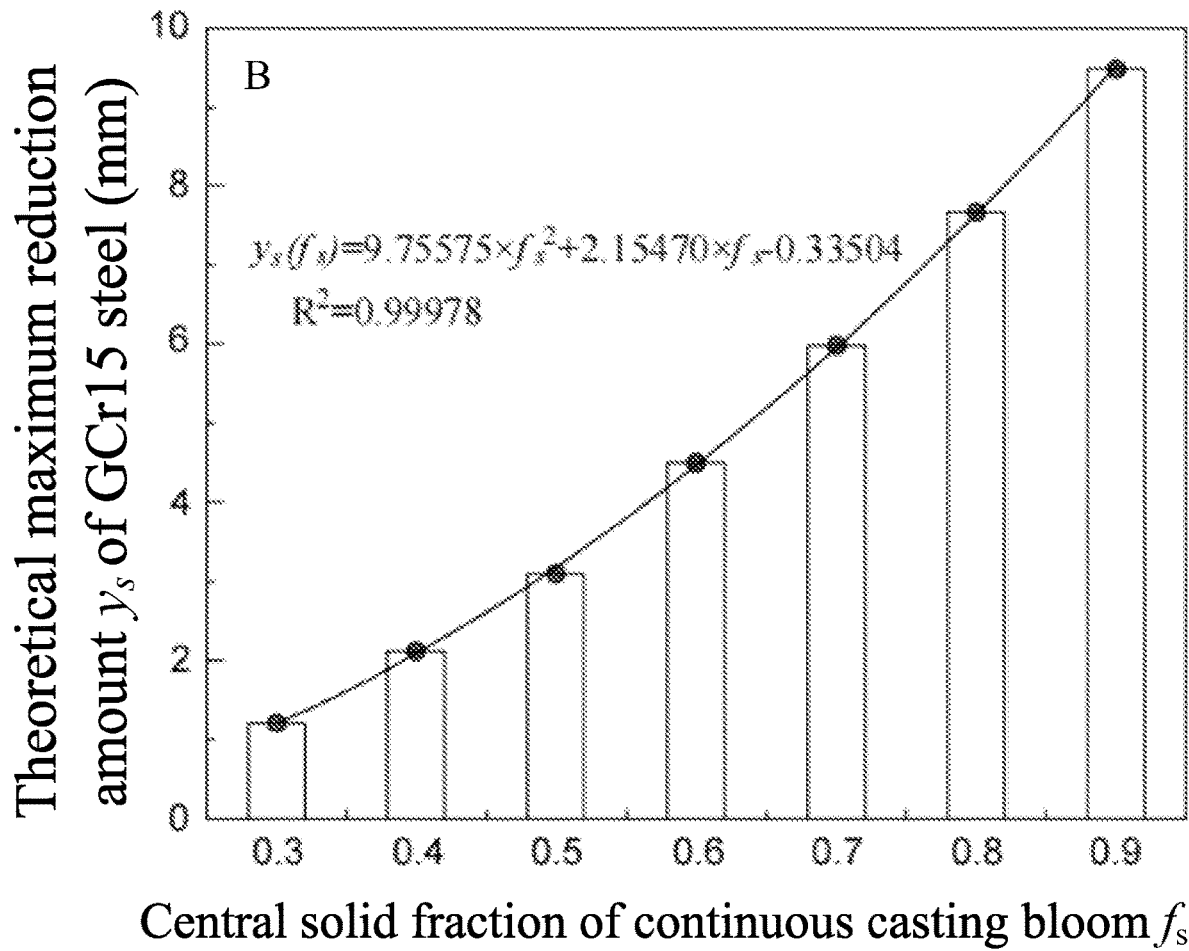
FIG. 5B represents theoretical maximum reduction amount $y_s(f_s)$ versus the reduction position $f_s$ for continuous casting bloom that does not cause internal cracking under soft reduction conditions.

4) For soft reduction, in the working condition at any reduction position, there is a cracking susceptible region on the cross section. Taking for example the working condition where the reduction position is $f_s=0.5$, the cracking susceptible region is as shown in the grid region in FIG. 4A. When a maximum strain $\varepsilon_{max}(y, f_s)$ within the region exceeds a critical strain $\varepsilon_{cri}$, the continuous casting bloom will crack. The critical strain $\varepsilon_{cri}$ of the continuous casting bloom of a different steel composition is as shown in FIG. 4B. For the GCr15 steel used in the simulation, the critical strain $\varepsilon_{cri}$ thereof is 0.5%. The maximum strain of the cracking susceptible region of the continuous casting bloom in a series of typical working conditions described above is extracted, and a relationship of the maximum strain $\varepsilon_{max}(y, f_s)$ of the cracking susceptible region to a reduction amount in a series of typical soft reduction working conditions is obtained, as shown in FIG. 5A. In combination with the critical strain $\varepsilon_{cri}$ of the GCr15 steel, a relationship of a theoretical maximum reduction amount $y_s(f_s)$ without internal cracking in the continuous casting bloom under soft reduction to a reduction position is obtained, as shown in FIG. 5B, i.e., $y_s(f_s)=-0.33504+2.15470 \times f_s+9.75575 \times f_s^2$, which is in the form of a quadratic function. Therefore, the change of the cracking susceptibility of the continuous casting bloom under soft reduction may be quantitatively considered in real time according to the online three-dimensional solidification and heat transfer calculation model for a continuous casting bloom, i.e., $y_s(f_s)=a_3+b_3 \times f_s+c_3 \times f_s^2$ ($0.3 \leq f_s \leq 1$), where $a_3$, $b_3$ and $c_3$ are regression coefficients, which need to be determined by simulation results in a series of typical working conditions.

Figure 6:
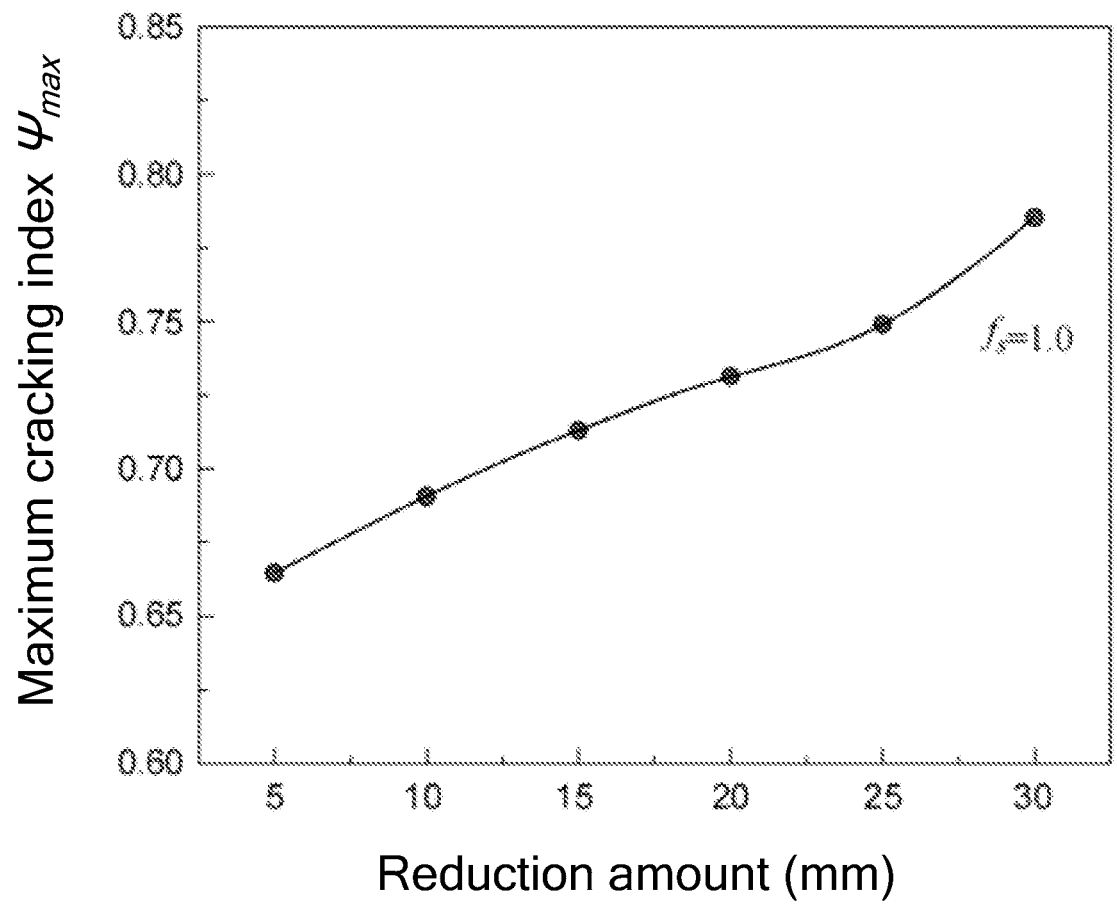
FIG. 6 illustrates the relationship of maximum cracking index $\psi_{max}$ of continuous casting bloom under heavy reduction with the reduction amount y (taking for example conditions of $f_s=1.0$ at reduction position and reduction amount of 5-30 mm)

For a heavy reduction process, current studies believe that a continuous casting bloom will not crack internally and may be at the risks of surface cracking and corner cracking. Therefore, maximum stresses in the surface of and in the vicinity of corners of the continuous casting bloom and corresponding temperatures in a series of working conditions are directly extracted. A ratio of the maximum stress to a tensile strength of the steel type at this temperature is called a maximum cracking index $\psi_{max}(y, f_s)$ of the continuous casting bloom. FIG. 6 illustrates the maximum cracking index of the continuous casting bloom when a reduction amount of 5-30 mm is applied at the position $f_s=1.0$. As shown in the figure, when heavy reduction is carried out at the position $f_s=1.0$, no crack will occur even with a reduction amount of 30 mm. For the position farther away from meniscus, the further decrease of the surface temperature of continuous casting bloom will lead to the further increase of its resistance to crack generation. Thus, for the simulated steel type and working condition, no crack will occur under heavy reduction, and a reduction amount of a heavy reduction roller is mainly determined by the reduction capability of the reduction roller. Even though the continuous casting bloom will not crack under heavy reduction, the change of the cracking susceptibility of the continuous casting bloom under heavy reduction may also be quantitatively considered in real time according to the online three-dimensional solidification and heat transfer calculation model for a continuous casting bloom, i.e., $y_h(f_s)=a_4+b_4 \times f_s$ ($0.3 \leq f_s \leq f_{s,m}$), where $a_4$ and $b_4$ are regression coefficients, which need to be determined by simulation results in a series of typical working conditions.

5) In a production practice field, a set of coefficients $k_1$, $k_2$, $k_3$ and $k_4$ is introduced when a theoretical ultimate reduction amount $y_{max}(f_s)$ is used. Normally, the coefficients $k_1$, $k_2$, $k_3$ and $k_4$ are all 1; and in production practice, to adapt to on-site production, the coefficients $k_1$, $k_2$, $k_3$ and $k_4$ should slightly fluctuate around 1. Therefore, in a production case with the section dimensions of 420 mm×530 mm, the steel type GCr15 steel and the casting speed of 0.5 m/min, the theoretical ultimate reduction amount $y_{max}(f_s)$ may be expressed as:

$$y_{max}(f_s) = \mathrm{Min} \begin{cases} k_1 \times (13.40517 - 9.02650 \times f_s) & 0.3 \leq f_s \leq f_{s,n} \\ k_2 \times (14.93977 - 3.22846 \times f_s) & 0.3 \leq f_s \leq f_{s,m} \\ k_3 \times (9.75575 \times f_s^2 + 2.15470 \times f_s - 0.33504) & 0.3 \leq f_s \leq 1.0 \end{cases} \quad (4)$$

Figure 7A:
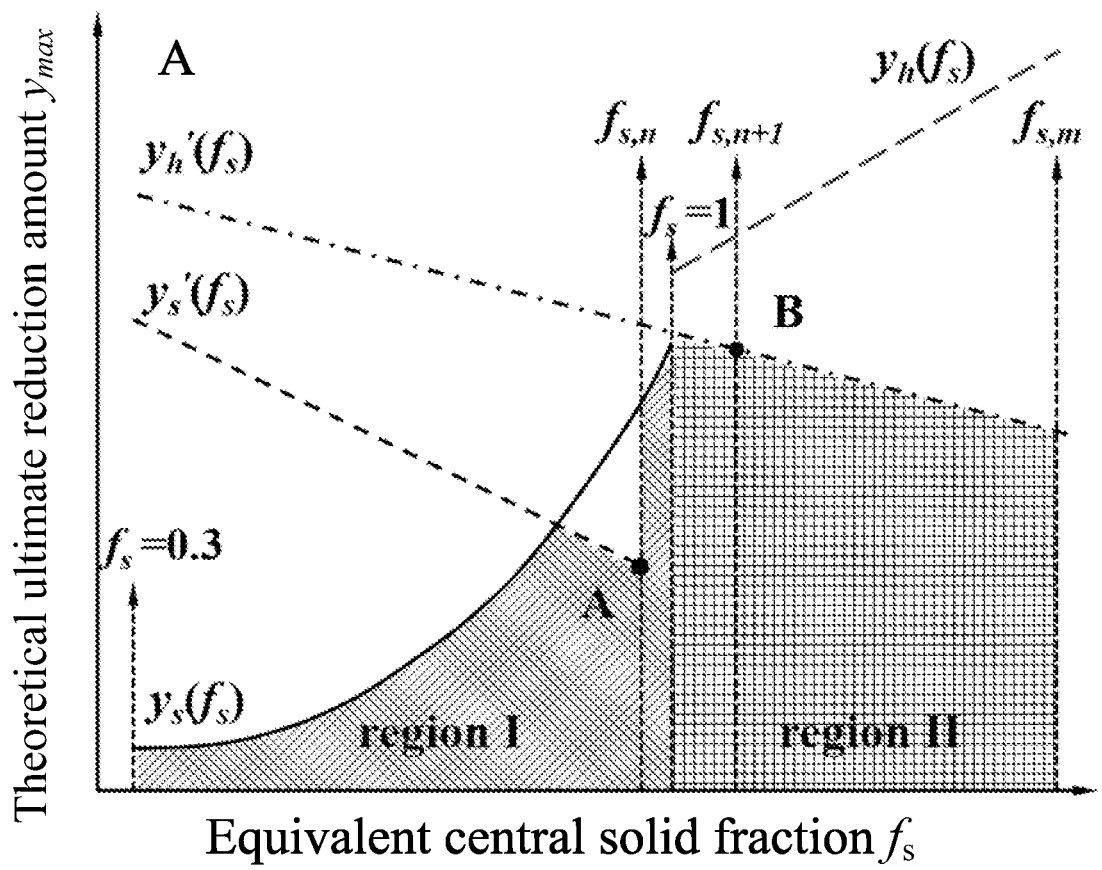
Figure 7B:
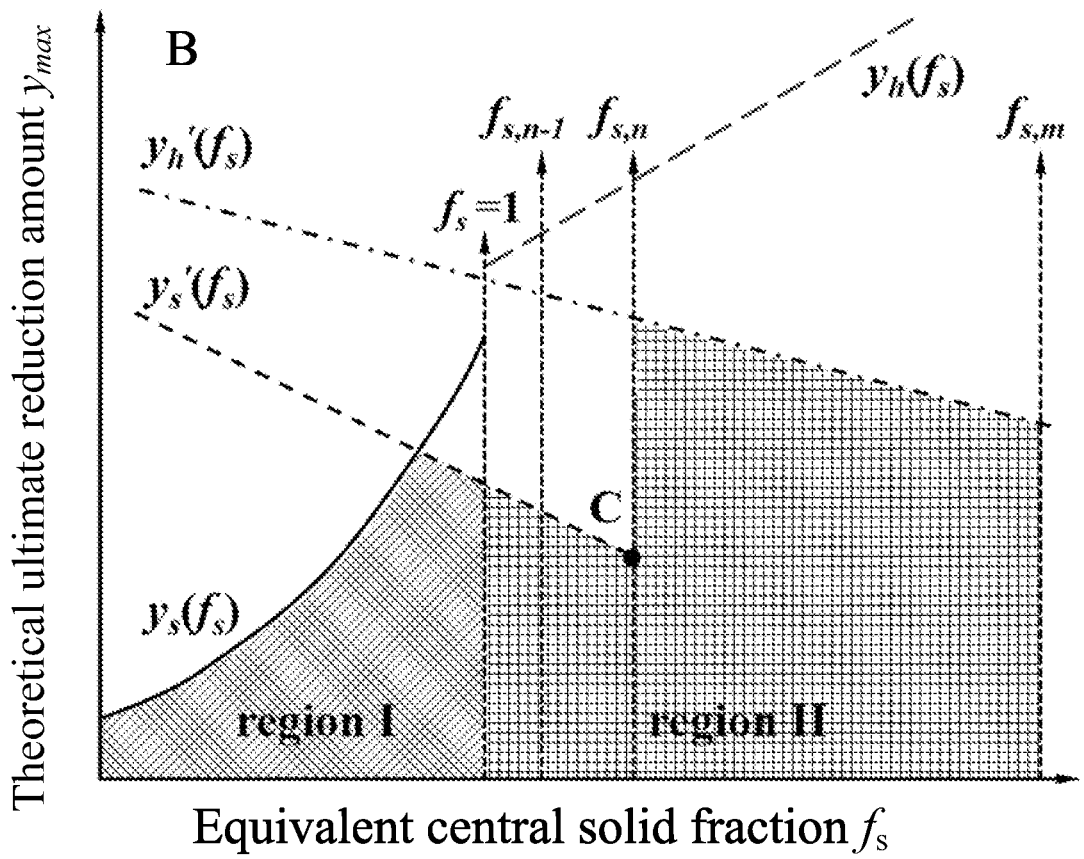
Figure 7C:
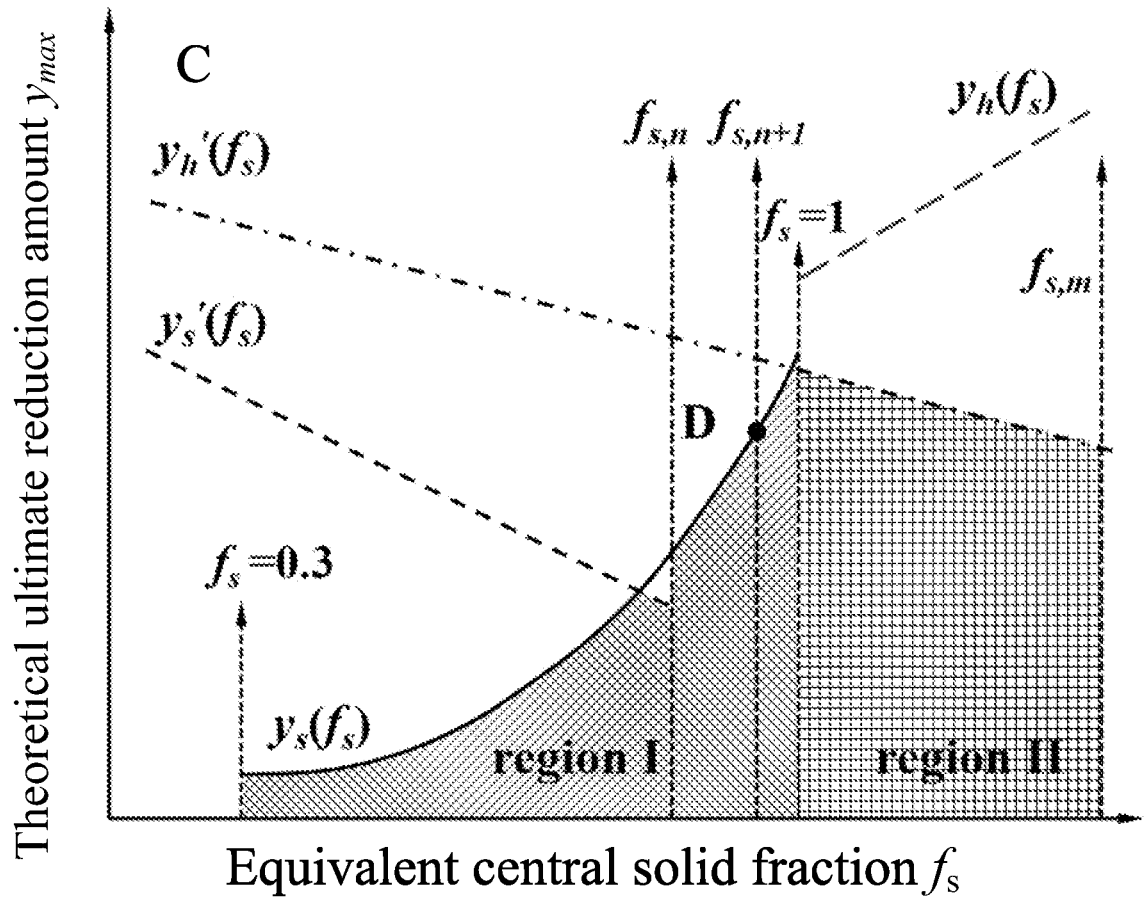

6) On the basis of steps 3)-5), FIGS. 7A-C are schematic diagram illustrating a relationship of a theoretical ultimate reduction amount $y_{max}(f_s)$ to a reduction position $f_s$ with overall consideration of the cracking susceptibility of the continuous casting bloom and the device reduction capability. There are m pairs of reduction rollers in total, including n pairs of soft reduction rollers and m-n pairs of heavy reduction rollers. In the figure, region I is a soft reduction zone and region II is a heavy reduction zone. FIG. 7A shows a normal production situation where the solidification end point is located between the last soft reduction roller and the first heavy reduction roller, in which point A represents an actual reduction amount that should be applied by the last soft reduction roller and point B represents an actual reduction amount that should be applied by the first heavy reduction roller. FIG. 7B shows a production situation where the solidification end point is near the front, in which part of the soft reduction rollers will perform the heavy reduction (the device for soft reduction is at the risk of damage), and an actual reduction amount when the last soft reduction roller performs the heavy reduction may be represented by point C. FIG. 7C shows a production situation where a solidification end point is near the back, in which the heavy reduction rollers perform the soft reduction (which may result in that a total heavy reduction amount does not reach a preset value), and an actual reduction amount when the first heavy reduction roller performs the soft reduction may be represented by point D. Therefore, it is necessary to calculate a thermal state of the continuous casting bloom online in real time and reasonably control the solidification end point of the continuous casting bloom, guaranteeing that the reduction process is carried out smoothly and stably and the quality of the continuous casting bloom is improved. In production practice, the online three-dimensional solidification and heat transfer calculation model for a continuous casting bloom is established to calculate changes in the thermal state of the continuous casting bloom, relative positions of the soft reduction and heavy reduction zones, the total reduction amount of the continuous casting bloom, the total soft reduction amount and the total heavy reduction amount in real time.

Figure 8:
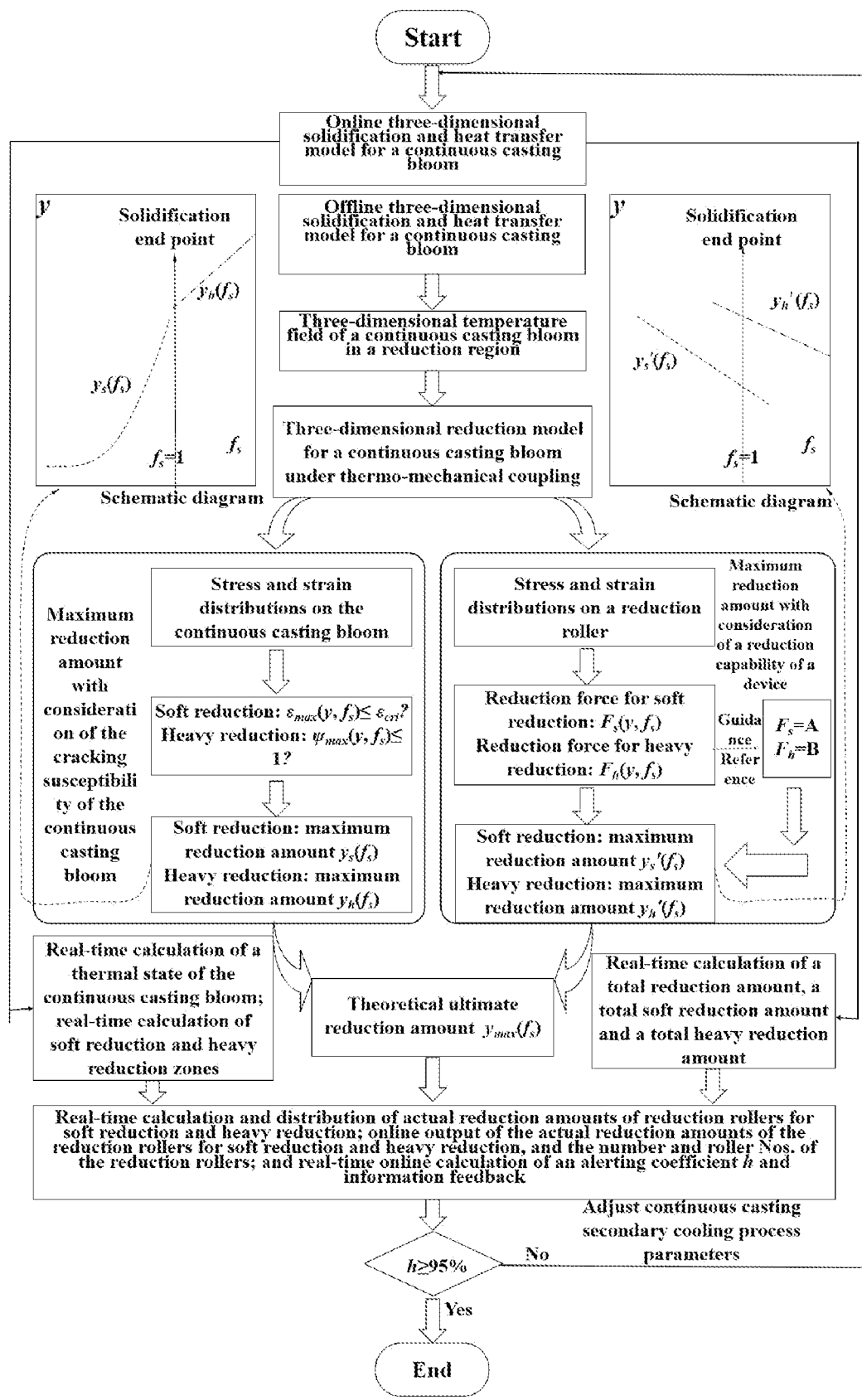
FIG. 8 is a logical framework diagram of online cooperative control method for soft reduction and heavy reduction in continuous casting bloom.
Figure 9:
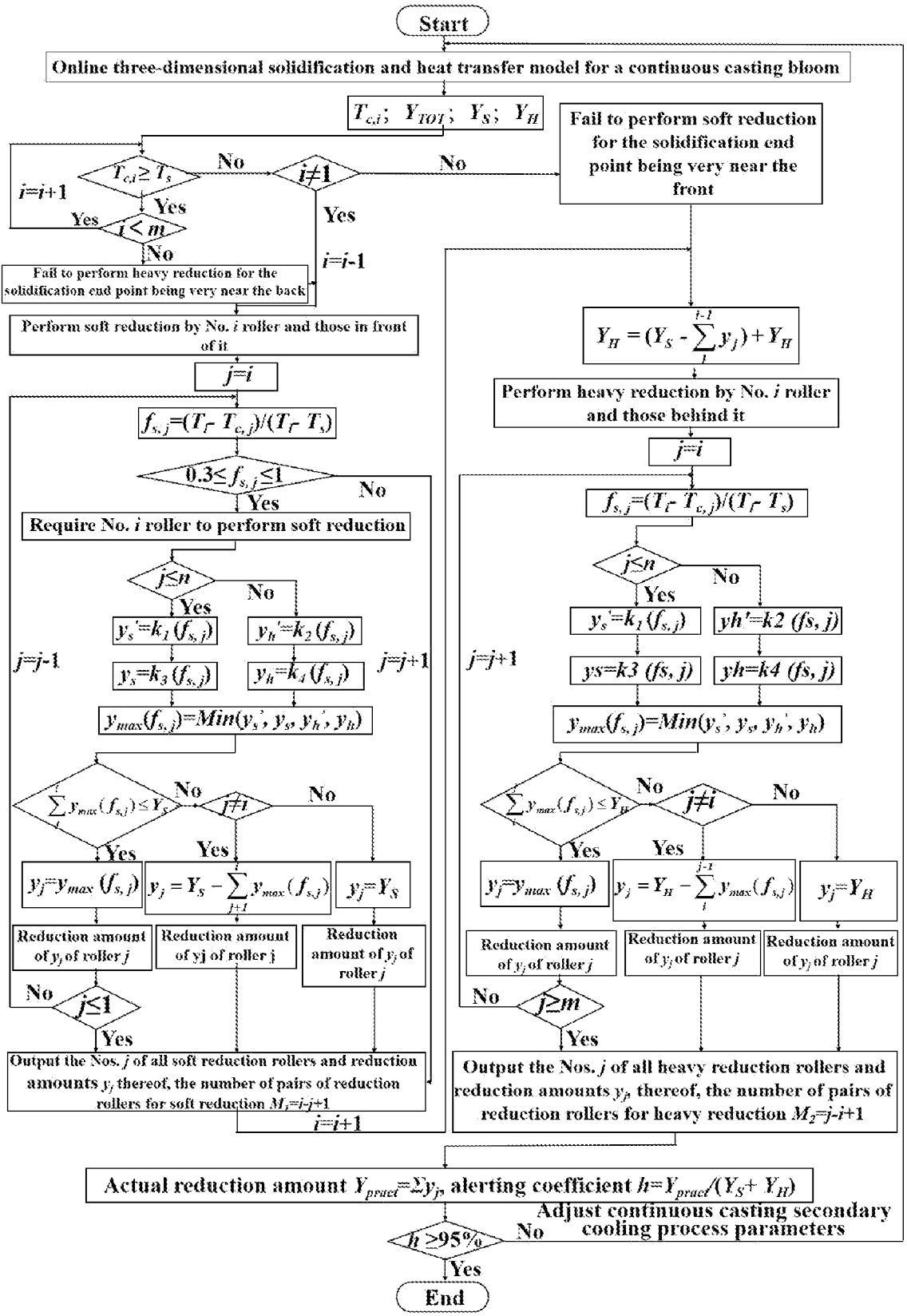
FIG. 9 is a schematic diagram of specific implementation of online cooperative control method for soft reduction and heavy reduction in continuous casting bloom.

7) On the basis of the online three-dimensional solidification and heat transfer calculation model for a continuous casting bloom, FIG. 8 and FIG. 9 illustrate a logical framework and an embodiment of an online cooperative control method for soft reduction and heavy reduction in bloom continuous casting. Zones in which soft reduction and heavy reduction are performed respectively are divided according to the real-time thermal state of the continuous casting bloom calculated by the online three-dimensional solidification and heat transfer calculation model for a continuous casting bloom. Starting from the last soft reduction roller, a reduction amount is distributed for each roller forwards one by one, and the actual reduction amount of each roller is determined by the theoretical ultimate reduction amount $y_{max}(f_s)$ determined in step 4). The reduction amount of the first soft reduction roller is obtained by subtracting the sum of the reduction amounts of the second to the last soft reduction rollers from the total soft reduction amount, whereby the roller Nos. and the number of the reduction rollers for soft reduction are determined. On this basis, the actual reduction amount and distribution of the reduction rollers for soft reduction, and the roller Nos. and the number of the reduction rollers for soft reduction are output online.

If the actual total soft reduction amount does not reach a preset total soft reduction amount, the part not reached is transferred to the heavy reduction, and the total heavy reduction amount includes is the sum of this part and an initial preset total heavy reduction amount. For heavy reduction, the reduction roller after the last soft reduction roller is the first heavy reduction roller. Starting from the first heavy reduction roller, a reduction amount is distributed for each reduction roller backwards one by one, and the roller Nos. and the number of the reduction rollers are determined. The reduction amount of the last heavy reduction roller is obtained by subtracting the previous summed total heavy reduction amount from the total heavy reduction amount. On this basis, the actual reduction amounts and distribution of the reduction rollers for heavy reduction, and the roller Nos. and the number of the reduction rollers for soft reduction are output online.

An actual total reduction amount $Y_{pract}$ is obtained according to the actual reduction amounts of the rollers for soft reduction and heavy reduction. A set total reduction amount is $Y_{TOT}$. An alerting coefficient is introduced: $h=Y_{pract}/Y_{TOT} \times 100\%$, and real-time calculation is performed on the alerting coefficient h. If the alerting coefficient h>95%, an alerting level is green, indicating that the actual reduction amount substantially reaches the set total reduction amount and production runs normally. If the alerting coefficient h≤95%, the alerting level is red, and at this time, an online cooperative control system needs to feed back information to a continuous casting secondary cooling control system to adjust and optimize continuous casting secondary cooling process parameters. Step 5) is then repeated until the alerting coefficient h>95%, and the actual reduction amounts and distribution of the rollers for soft reduction and heavy reduction, and the roller Nos. and the number of the reduction rollers are output online again.

EXAMPLE

Section dimensions are 420 mm×530 mm; a working casting speed is 0.5 m/min; a steel type is GCr15 steel; and there are 10 pairs of reduction rollers (i.e., m=10) with a roller spacing of 1.45 m, where $1^\#$-$7^\#$ reduction rollers are soft reduction rollers (i.e., n=7) with a reduction capability of 250 tons (i.e., $F_s$=250 t); and $8^\#$-$10^\#$ reduction rollers are heavy reduction rollers with a reduction capability of 365 tons (i.e., $F_h$=365 t). A soft reduction zone is: $f_s$=0.3-1.0.

FIG. 10 illustrates initial calculation results of an online cooperative control method for soft reduction and heavy reduction in bloom continuous casting provided in the present disclosure, and final performing results of the online cooperative control method after the adjustment of continuous casting secondary cooling process parameters, respectively. In an initial state, preset reduction amounts are: $Y_{TOT}(t)=a-b(t)-c=420-4.2-380=35.8$ mm, $Y_S=3.5\%$ a=3.5%×420=14.7 mm, and $Y_H(t)=Y_{TOT}(t)-Y_S=35.8-14.7=21.1$ mm. $5^\#$-$9^\#$ rollers perform five-roller soft reduction, and actual soft reduction amounts are 0.33 mm, 2.18 mm, 2.56 mm, 4.60 mm and 5.04 mm, respectively. $10^\#$ roller performs single-roller heavy reduction, and an actual heavy reduction amount is 8.72 mm. With an alerting coefficient h=(0.33+2.18+2.56+4.60+5.04+8.72)/35.8×100%=65.4%<95%, the total reduction amount does not reach a predetermined target because the solidification end point of a continuous casting bloom is very near the back and the soft reduction rollers are not used sufficiently. The continuous casting secondary cooling process parameters (such as a secondary cooling water distribution and a casting speed) need to be adjusted, and a thermal state of the continuous casting bloom and the actual reduction amount of each reduction roller are recalculated online.

After the continuous casting secondary cooling process parameters are adjusted, the solidification end point of the continuous casting bloom is located between $7^\#$ and $8^\#$ rollers. Under this production condition, preset reduction amounts are $Y_{TOT}(t)=a-b(t)-c=420-3.7-380=36.3$ mm, $Y_S=3.5\%$ a=3.5%×420=14.7 mm, and $Y_H(t)=Y_{TOT}(t)-Y_S=36.3-14.7=21.6$ mm. The actual reduction amount of each reduction roller and a distribution of the total reduction amount are calculated online in real time. That is, $3^\#$-$7^\#$ rollers perform five-roller soft reduction, and actual soft reduction amounts are 0.39 mm, 1.82 mm, 2.76 mm, 4.86 mm and 4.87 mm, respectively. $8^\#$-$10^\#$ rollers perform three-roller heavy reduction, and actual heavy reduction amounts are 8.66 mm, 7.02 mm and 5.75 mm, respectively. With the alerting coefficient h=(0.39+1.82+2.76+4.86+4.87+8.66+7.02+5.75)/36.3×100%=99.5%>95%, the total reduction amount reaches the predetermined target, the performing results are output online.

It should that the above example is only intended to explain rather than to limit the technical solutions of the present disclosure. The technical content and features of the present disclosure have been disclosed. Those of ordinary skill in the art will understand that modifications or equivalent replacements made to the technical solutions of the present disclosure without departing from the spirit and scope of the technical solutions should be included within the scope of the claims of the present disclosure.

What is claimed is:
1. An online cooperative control method for soft reduction and heavy reduction in bloom continuous casting, said method comprising:
   1) establishing of an offline three-dimensional solidification and heat transfer model for a continuous casting bloom and calculation of three-dimensional temperature fields of continuous casting blooms of different steel types, comprising:
   classifying produced steel types, collecting thermophysical parameters comprising a liquidus/solidus temperature, a density, specific heat, a heat conductivity coefficient and latent heat of solidification from the steel types; establishing the offline three-dimensional solidification and heat transfer model for a continuous casting bloom according to key information about main parameters of a continuous casting machine and boundary conditions;

and calculating three-dimensional temperature fields of continuous casting blooms of different steel types according to the offline three-dimensional solidification and heat transfer model for a continuous casting bloom;

2) establishing of a three-dimensional reduction model for a continuous casting bloom under thermo-mechanical coupling and simulation of a reduction process of a continuous casting bloom in a different thermal state, comprising:

establishing a geometric model for a reduction process of a continuous casting bloom by using a finite element software; performing numerical calculation of the reduction process of the continuous casting bloom in a sequential coupling manner, namely firstly importing the three-dimensional temperature fields calculated by the offline three-dimensional solidification and heat transfer model for a continuous casting bloom in step 1) to the geometric model, then performing simulation calculation of a temperature field through a heat transfer model in the finite element software, followed by coupling a calculation result into the three-dimensional reduction model for a continuous casting bloom, and finally performing simulation calculation of the reduction process of the continuous casting bloom under thermo-mechanical coupling; and denoting a reduction position of the continuous casting bloom by an equivalent central solid fraction $f_s$: $f_s=(T_l-T_c)/(T_l-T_s)$, wherein $T_l$ represents a liquidus temperature; $T_s$ represents a solidus temperature; and $T_c$ represents a center temperature of the continuous casting bloom; the equivalent central solid fraction $f_s$ is capable of being greater than 1, and $f_s>1$ indicates that the continuous casting bloom has been completely solidified; and simulating a reduction process in which a different reduction amount y is applied to the continuous casting bloom at a different reduction position by using the three-dimensional reduction model for a continuous casting bloom under thermo-mechanical coupling, and obtaining stress and strain distributions on a reduction roller and the continuous casting bloom;

3) determining of a maximum reduction amount of the continuous casting bloom in a different thermal state with consideration of a device reduction capability, comprising:

directly reading a stress value on the reduction roller and a grid area to calculate a reduction force according to the stress distribution on the reduction roller at different reduction positions of the continuous casting bloom in step 2); obtaining quantitative relationships $F_s(y, f_s)$ and $F_h(y, f_s)$ of a reduction force to a reduction amount in soft reduction and heavy reduction with different solid fractions by analyzing results of applying different reduction amounts to the continuous casting bloom in different thermal states, and guiding a design of the device reduction capability according to the quantitative relationships; and determining maximum reduction amounts $Y_s'(f_s)_s'(f_s)$ and $y_h'(f_s)$ of the devices for soft reduction and heavy reduction at different positions according to a designed actual reduction capability;

4) determining of a maximum reduction amount in a different thermal state with consideration of a cracking susceptibility of the continuous casting bloom, comprising:

reading a maximum strain $\epsilon_{max}(y, f_s)$ of a cracking susceptible region of the continuous casting bloom in each working condition according to the stress and strain distributions of the continuous casting bloom obtained in step 2), and determining a relative magnitude between the maximum strain and a critical strain $\epsilon_{cri}$; obtaining a quantitative relationship $y_s(f_s)$ of a maximum reduction amount to a reduction position without internal cracking in the continuous casting bloom under soft reduction from the relative magnitudes between the maximum strain in a series of working conditions and the critical strain; for a heavy reduction process, calculating a maximum cracking index $\psi_{max}(y, f_s)$ of the continuous casting bloom in a series of working conditions from a relationship of a stress to a tensile strength of a steel type according to a stress distribution on the continuous casting bloom in a series of working conditions; and obtaining a quantitative relationship $y_h(f_s)$ of a maximum reduction amount to a reduction position without surface cracking and corner cracking in the continuous casting bloom during heavy reduction according to a magnetite of the cracking index;

5) determining of a theoretical ultimate reduction amount with overall consideration of the cracking susceptibility of the continuous casting bloom and the device reduction capability, comprising:

obtaining a theoretical ultimate reduction amount $y_{max}(f_s)$ at a different reduction position within an entire reduction region on a basis of taking the cracking susceptibility of the continuous casting bloom and the device reduction capability into overall consideration according steps 3) and 4):

$$y_{max}(f_s) = \mathrm{Min} \begin{cases} y_s'(f_s) & 0.3 \le f_s \le f_{s,n} \\ y_h'(f_s) & 0.3 \le f_s \le f_{s,m} \\ y_s(f_s) & 0.3 \le f_s \le 1.0 \\ y_h(f_s) & 1.0 < f_s \le f_{s,m} \end{cases} \quad (1)$$

wherein $f_{s,n}$ and $f_{s,m}$ represent corresponding equivalent central solid fractions of the continuous casting bloom at positions of a nth pair of reduction rollers and a mth pair of reduction rollers of the continuous casting machine, respectively, wherein n is a total number of soft reduction rollers, and m is a total number of pairs of reduction rollers;

6) establishing of an online three-dimensional solidification and heat transfer calculation model for a continuous casting bloom and real-time calculation of a thermal state of the continuous casting bloom, comprising:

on a basis of the offline three-dimensional solidification and heat transfer calculation model for a continuous casting bloom, dividing the continuous casting bloom into small slices in a casting direction by a crystallizer according to a time step and a casting speed, wherein the slices are continuously updated at a meniscus of the crystallizer and injected into the crystallizer, and solidified and cooled slices continuously leave from a shear point; during a process from the slices entering the crystallizer to leave from the shear point, calculating and recording changes in cooling boundary condition and temperature field experienced by each slice during continuous casting online with the model using an array storage method, thereby accurately determining real-time changes in the thermal state of the continuous casting bloom and a solidification end position; and performing simulation calculation on a real-time three-dimensional temperature field distribution of the continuous casting bloom and the equivalent central solid fraction of the continuous casting bloom according to the established online three-dimensional solidification and heat transfer calculation model for a continuous casting bloom;

7) calculating, in real-time, of relative positions of soft reduction and heavy reduction zones and a total reduction amount of the continuous casting bloom, wherein changes in relative positions of soft reduction and heavy reduction zones during continuous casting influence final implementation of soft reduction and heavy reduction processes, comprising:

calculating a relative position of a soft reduction zone ($0.3 \leq f_s \leq 1.0$) and a relative position of a heavy reduction zone ($1.0 \leq f_s \leq f_{s,m}$) in real time according to the online three-dimensional solidification and heat transfer calculation model for a continuous casting bloom established in step 6);

wherein natural shrinkage of the continuous casting bloom changes with changing working conditions, resulting in unstable target thickness and metallurgical reduction effect of the continuous casting bloom; to guarantee stable target thickness and metallurgical reduction effect of the continuous casting bloom, a natural shrinkage amount $b(t)$ of the continuous casting bloom is calculated in real time with the online three-dimensional solidification and heat transfer calculation model for a continuous casting bloom; a total reduction amount $Y_{ToT}$ is determined by a relationship of a sectional thickness a of the crystallizer to the natural shrinkage amount $b(t)$ of the continuous casting bloom and a target thickness c of the continuous casting bloom, namely $Y_{ToT}(t)=a-b(t)-c$; a set initial total soft reduction amount is: $Y_S=2-4\%$ a, and a set initial total heavy reduction amount is: $Y_H(t)=Y_{ToT}(t)-Y_S$; When implementing online cooperative control of soft reduction and heavy reduction, limited by a device, a reduction zone and a final reduction effect, $Y_{ToT}(t)$, $Y_S$ and $Y_H(t)$ need to be adjusted appropriately in real time, when an actual total soft reduction amount $Y_{S,Pract}$ is smaller than a set initial total soft reduction amount $Y_S$, the initial total heavy reduction amount is: $Y_H(t) = Y_{ToT}(t)-Y_{S,\,Pract}$;

8) online cooperative controlling of soft reduction and heavy reduction in continuous casting and online output of performing results, comprising:

calculating in real-time and distributing of actual reduction amounts of rollers for soft reduction and heavy reduction, online output of numbers and roller Nos. of reduction rollers for soft reduction and heavy reduction, and real-time calculating of an alerting coefficient h and information feedback;

wherein calculating and distributing of actual reduction amounts of the rollers for soft reduction and heavy reduction include determining the last pair of reduction rollers for performing soft reduction according to step 7) and denoting a roller No. as i; in combination with steps 5) and 6), wherein a theoretical ultimate reduction amount of each reduction roller is calculated in real time, wherein a reduction amount is distributed for each roller for soft reduction forwards one by one, and a reduction amount is distributed for each roller for heavy reduction backwards one by one; wherein a real-time theoretical ultimate reduction amounts $y_k$ and $y_p$ of a first pair of reduction rollers for performing soft reduction (with a roller No. denoted by k) and a last pair of reduction rollers for performing heavy reduction (with a roller No. denoted by p) are respectively provided as follows:

$$y_k = \begin{cases} y_{max}(f_{s,k}) & \sum_{k}^{i} y_{max}(f_{s,i}) < Y_S \\ Y_S - \sum_{k+1}^{i} y_{max}(f_{s,i}) & \sum_{k}^{i} y_{max}(f_{s,i}) \geq Y_S \end{cases} \quad (2)$$

$$y_p = \begin{cases} y_{max}(f_{s,p}) & \sum_{k}^{p} y_{max}(f_{s,i}) < Y_H(t) \\ Y_H(t) - \sum_{i}^{p-1} y_{max}(f_{s,i}) & \sum_{i}^{p} y_{max}(f_{s,i}) \geq Y_H(t) \end{cases} \quad (3)$$

wherein $f_{s,k}$ and $f_{s,p}$ represent corresponding equivalent central solid fractions of the continuous casting bloom at positions of the first pair of reduction rollers for performing soft reduction and the last pair of reduction rollers for performing heavy reduction, respectively; and the actual reduction amounts of the rollers for soft reduction and heavy reduction calculated in real time above, and the number and roller Nos. of reduction rollers are output online;

real-time calculation is performed on the alerting coefficient h according to the actual reduction amounts the rollers for soft reduction and heavy reduction output online, wherein the alerting coefficient is: $h = Y_{pract}/Y_{TOT} \times 100\%$, and $Y_{pract}$ represents an actual total reduction amount calculated according to an online output result; if the alerting coefficient is $h > 95\%$, an actual reduction amount substantially reaches a set total reduction amount; if the alerting coefficient is $h \leq 95\%$, an online cooperative control system feeds back information to a continuous casting secondary cooling control system to adjust and optimize continuous casting secondary cooling process parameters; after the continuous casting secondary cooling process parameters are adjusted, a real-time thermal state and a solidification end point position of the continuous casting bloom are calculated in real time with the online three-dimensional solidification and heat transfer calculation model for a continuous casting bloom; steps 6)-8) are then repeated until the alerting coefficient reaches $h > 95\%$; and finally, the actual reduction amounts of the rollers for soft reduction and heavy reduction, and the number and roller Nos. of reduction rollers are output again.

2. The online cooperative control method for soft reduction and heavy reduction in bloom continuous casting according to claim 1, wherein the maximum reduction amounts $y_s'(f_s)$ and $y_h'(f_s)$ of the continuous casting bloom in different thermal states with consideration of the reduction capability of the device in step 3) are in the form of a linear function, and changes in the device reduction capabilities for soft reduction and heavy reduction are quantitatively considered in real time with the online three-dimensional solidification and heat transfer calculation model for a continuous casting bloom:

$$y_s'(f_s)=a_1+b_1 \times f_s, 0.3 \leq f_s \leq f_{s,n} \quad (4)$$

$$y_h'(f_s)=a_2+b_2 \times f_s, 0.3 \leq f_s \leq f_{s,m} \quad (5)$$

wherein $a_1$, $b_1$, $a_2$ and $b_2$ are regression coefficients, which are determined jointly by simulation results in a series of typical working conditions and actually designed reduction forces $F_s$ and $F_h$ for the devices; and when $F_s=250$ t and $F_h=365$ t, under working conditions of a cross section 420 mm×530 mm, GCr15 steel and a casting speed of 0.5 m/min, $a_1=13.40517$, $b_1=-9.02650$, $a_2=14.93977$, and $b_2=-3.22846$.

3. The online cooperative control method for soft reduction and heavy reduction in bloom continuous casting according to claim 1, wherein the maximum reduction amount $y_s(f_s)$ of the continuous casting bloom with consideration of the cracking susceptibility of the continuous casting bloom in a different thermal state in step 4) is in the form of a quadratic function, and $y_h(f_s)$ is in the form of a linear function, and changes in the cracking susceptibility of the continuous casting bloom under soft reduction and heavy reduction are quantitatively considered in real time with the online three-dimensional solidification and heat transfer calculation model for a continuous casting bloom:

$$y_s(f_s)=a_3+b_3 \times f_s+c_3 \times f_s^2 \quad 0.3 \leq f_s \leq 1 \qquad (6)$$

$$y_h(f_s)=a_4+b_4 \times f_s \quad 0.3 \leq f_s \leq f_{s,m} \qquad (7)$$

wherein $a_3$, $b_3$, $c_3$, $a_4$ and $b_4$ are regression coefficients, which are determined by simulation results in a series of working conditions; and under working conditions of a cross section 420 mm×530 mm, GCr15 steel and a casting speed of 0.5 m/min, $a_3=-0.33504$, $b_3=2.15470$, and $c_3=9.75575$.

4. The online cooperative control method for soft reduction and heavy reduction in bloom continuous casting according to claim 1, wherein for the theoretical ultimate reduction amount $y_{max}(f_s)$ in step 5), changes in the cracking susceptibility of the continuous casting bloom and the device reduction capability in different thermal states are taken into overall consideration, thereby avoiding cracking of the continuous casting bloom and damage of the device while ensuring a significant reduction effect; the maximum reduction amounts $y_s(f_s)$ and $y_h(f_s)$ with consideration of the cracking susceptibility of the continuous casting bloom according to criteria $\varepsilon_{max}(y, f_s) \leq \varepsilon_{cri}$ (soft reduction) and $\psi_{max}(y, f_s) \leq 1$ (heavy reduction); the maximum reduction amounts $y_s'(f_s)$ and $y_h'(f_s)$ with consideration of the reduction capability of the device are determined according to the quantitative relationships $F_s(y, f_s)=A$ (soft reduction) and $F_h(y, f_s)=B$ (heavy reduction) of a reduction force to a reduction quantity; and the theoretical ultimate reduction amount $y_{max}(f_s)$ is determined by a minimum value among $y_s(f_s)$, $y_h(f_s)$, $y_s'(f_s)$ and $y_h'(s)$.

5. The online cooperative control method for soft reduction and heavy reduction in bloom continuous casting according to claim 1, wherein when the theoretical ultimate reduction amount $y_{max}(f_s)$ in step 5) is used in a production practice field, a set of regulation coefficients $k_1$, $k_2$, $k_3$ and $k_4$ is used; on a basis of following a relationship of a theoretical ultimate reduction amount and a reduction position of the continuous casting bloom, an error caused by changes in device state and process parameters is taken into consideration; a parameter interface for debugging is reserved, which is configured to debug field software and production tests; when a specific produced steel type in a same class of steel types changes, a current result is usable as initial data for debugging for a new steel type:

$$y_{max}(f_s) = \mathrm{Min} \begin{cases} k_1 \times y_s'(f_s) & 0.3 \leq f_s \leq f_{s,n} \\ k_2 \times y_h'(f_s) & 0.3 \leq f_s \leq f_{s,m} \\ k_3 \times y_s(f_s) & 0.3 \leq f_s \leq 1.0 \\ k_4 \times y_h(f_s) & 1.0 < f_s \leq f_{s,m} \end{cases} \qquad (8)$$

wherein, the coefficients $k_1$, $k_2$, $k_3$ and $k_4$ are initialized to 1; and in production practice, to adapt to a practical production application, the coefficients $k_1$, $k_2$, $k_3$ and $k_4$ fluctuate around 1.

6. The online cooperative control method for soft reduction and heavy reduction in bloom continuous casting according to claim 1, wherein with the online three-dimensional solidification and heat transfer calculation model for a continuous casting bloom, the change of the thermal state of the continuous casting bloom during continuous casting is taken into consideration in real time, and in combination with the quantitative relationships of a theoretical ultimate reduction amount to the reduction position, real-time calculation and distribution of actual reduction amounts of reduction rollers for soft reduction and heavy reduction, online output of actual reduction amounts of the reduction rollers for soft reduction and heavy reduction, and the number and roller Nos. of the reduction rollers, and real-time calculation of the alerting coefficient h and information feedback are realized.

\* \* \* \* \*